(12) United States Patent
Deguchi et al.

(10) Patent No.: US 8,380,924 B2
(45) Date of Patent: *Feb. 19, 2013

(54) STORAGE SYSTEM AND PROCESSING EFFICIENCY IMPROVING METHOD OF STORAGE SYSTEM

(75) Inventors: Akira Deguchi, Yokohama (JP); Norio Shimozono, Machida (JP); Kazuyoshi Serizawa, Tama (JP)

(73) Assignee: Hitachi, Ltd., Tokyo (JP)

( * ) Notice: Subject to any disclaimer, the term of this patent is extended or adjusted under 35 U.S.C. 154(b) by 790 days.

This patent is subject to a terminal disclaimer.

(21) Appl. No.: 12/526,774

(22) PCT Filed: May 27, 2009

(86) PCT No.: PCT/JP2009/002338
§ 371 (c)(1),
(2), (4) Date: Aug. 11, 2009

(87) PCT Pub. No.: WO2010/137071
PCT Pub. Date: Dec. 2, 2010

(65) Prior Publication Data
US 2011/0145532 A1  Jun. 16, 2011

(51) Int. Cl.
*G06F 12/16* (2006.01)
(52) U.S. Cl. .................. 711/114; 711/162; 711/E12.103

(58) Field of Classification Search .................. None
See application file for complete search history.

(56) References Cited

U.S. PATENT DOCUMENTS

| 6,378,039 | B1 | 4/2002 | Obara et al. |
|---|---|---|---|
| 2005/0172097 | A1 | 8/2005 | Voigt et al. |
| 2005/0198457 | A1 | 9/2005 | Mizuno et al. |
| 2008/0263190 | A1 | 10/2008 | Serizawa et al. |

FOREIGN PATENT DOCUMENTS

| EP | 2 015 168 A2 | 1/2009 |
|---|---|---|
| JP | 2008-269424 A | 11/2008 |

*Primary Examiner* — Kevin Verbrugge
(74) *Attorney, Agent, or Firm* — Foley & Lardner LLP

(57) ABSTRACT

A storage system 200 has a storage device 240 providing a plurality of logical volumes 250 used as data storage areas of a host 100 and a plurality of MPPKs 210 executing data IO processes for the logical volumes 250 from the host 100 and, when it is determined whether the MPPKs 210 correlated with the logical volumes 250 must be changed based on a storage function such as local copy set for the logical volumes 250, if it is determined that the change is necessary, the usage rates of processors 212 of the MPPKs 210 are acquired and compared with each other and if it is determined that the comparison result satisfies a predetermined condition, the process cost for the logical volumes 250 is calculated for each of the responsible MPPKs 210 to determine the destination MPPK 210 such that the costs of the MPPKs 210 are equalized.

15 Claims, 28 Drawing Sheets

VOLUME TABLE 2211

| 22111 | 22112 | 22113 | 22114 | 22115 |
|---|---|---|---|---|
| VOLUME NUMBER | FUNCTION BIT | USING JOB INFORMATION | WRITE COUNT | READ COUNT |
| 1 | — | 1,2,5 | 200 | 800 |
| 2 | LOCAL COPY SVOL | 3 | 0 | 0 |
| 3 | — | 6 | 30 | 80 |
| 4 | REMOTE COPY PVOL | 8 | 50 | 50 |
| 5 | REMOTE COPY TRANSFER DATA STORAGE VOL | 12 | 0 | 60 |
|  |  |  |  |  |

RESPONSIBLE MPPK TABLE 263

| 2631 | 2632 |
|---|---|
| VOLUME NUMBER | RESPONSIBLE MPPK NUMBER |
| 1 | 1 |
| 2 | 2 |
| 3 | 3 |
| 4 | 4 |

RESPONSIBLE MPPK TABLE 2212

| VOLUME NUMBER | RESPONSIBLE MPPK NUMBER | CHANGING BIT | DESTINATION MPPK NUMBER |
|---|---|---|---|
| 1 | 1 | ON | 2 |
| 2 | 1 | ON | 2 |
| 3 | 1 | OFF | — |
| 4 | 3 | ON | 1 |
| 5 | 2 | OFF | — |

Fig. 12

LOCAL COPY TABLE 2213

| PAIR NUMBER ~22131 | PVOL NUMBER ~22132 | SVOL NUMBER ~22133 | COPY AMOUNT (MB/s) ~22134 |
|---|---|---|---|
| 1 | 1 | 2 | 100 |
| 2 | 9 | 10 | 20 |
| 3 | 12 | 11 | 300 |
| 4 | 19 | 16 | 0 |
| 5 | 17 | 15 | 20 |
|  |  |  |  |

Fig. 16

EXTENDED VOLUME TABLE 2214

| EXTENDED VOLUME NUMBER /22141 | CONSTITUENT VOLUME NUMBER /22142 |
|---|---|
| 1 | 1、2、3 |
| 4 | 4、5、6、7 |
| 10 | 10、8、9 |
|  |  |

Fig. 20

REMOTE COPY TABLE 2215

| REMOTE COPY GROUP NUMBER (22151) | ATTRIBUTE (22152) | JVOL NUMBER (22153) | PVOL NUMBER (22154) | SVOL NUMBER (22155) | WRITE ORDER NUMBER (22156) |
|---|---|---|---|---|---|
| 1 | COPY SOURCE | 11, 12 | 1 | 20 | 100 |
| | | | 2 | 12 | |
| | | | 3 | 13 | |
| 2 | COPY SOURCE | 13, 14 | 4 | 34 | 1100 |
| | | | 5 | 16 | |
| | | | 6 | 18 | |
| | | | | | |

Fig. 23

RESPONSIBLE MPPK TABLE FOR REMOTE COPY GROUP 2216

| REMOTE COPY GROUP NUMBER | RESPONSIBLE MPPK NUMBER | CHANGING BIT | DESTINATION MPPK NUMBER |
|---|---|---|---|
| 1 | 1 | ON | 2 |
| 2 | 1 | ON | 2 |
| 3 | 1 | OFF | — |
| 4 | 3 | ON | 1 |
| 5 | 2 | OFF | — |

Fig. 26

MPPK USAGE RATE TABLE 2217

| MPPK NUMBER (22171) | USAGE RATE (%) (22172) |
|---|---|
| 1 | 50 |
| 2 | 60 |
| 3 | 20 |
| 4 | 80 |

[Fig. 27]

PROCESS COST TABLE 2218

| PROCESS TYPE | PROCESS COST (MICROSECOND) |
|---|---|
| NORMAL VOLUME READ | 10 |
| NORMAL VOLUME WRITE | 15 |
| EXTENDED VOLUME READ | 12 |
| EXTENDED VOLUME WRITE | 17 |
| PVOL READ OF LOCAL COPY | 30 |
| PVOL WRITE OF LOCAL COPY | 50 |
| COPY PROCESS ON PVOL SIDE OF LOCAL COPY | 110 |
| COPY PROCESS ON SVOL SIDE OF LOCAL COPY | 100 |
| PVOL READ OF REMOTE COPY | 11 |
| PVOL WRITE OF REMOTE COPY | 17 |
| SVOL READ OF REMOTE COPY | 11 |
| SVOL WRITE OF REMOTE COPY | 18 |
| JOURNAL CREATION PROCESS OF REMOTE COPY | 70 |
| JOURNAL TRANSFER PROCESS (COPY SOURCE) OF REMOTE COPY | 15 |
| JOURNAL DELETION PROCESS OF REMOTE COPY | 5 |
| JOURNAL TRANSFER PROCESS (COPY DESTINATION) OF REMOTE COPY | 20 |
| WRITING JOURNAL DETERMINING PROCESS OF REMOTE COPY | 10 |
| JOURNAL WRITING PROCESS OF REMOTE COPY | 30 |

Column IDs: 22181 (PROCESS TYPE), 22182 (PROCESS COST)

STORAGE SYSTEM AND PROCESSING EFFICIENCY IMPROVING METHOD OF STORAGE SYSTEM

TECHNICAL FIELD

The present invention relates to a storage system and a processing efficiency improving method of the storage system, and, more particularly, to a storage system and a processing efficiency improving method of the storage system capable of preventing increase in communication overhead of a processor executing input/output processes for a plurality of logical storage areas included in the storage system to improve the processing efficiency of the storage system.

BACKGROUND ART

Various organizations such as governments, companies, and colleges use a relatively large scale storage system to manage data since a large amount and variety of data are handled. This storage system is configured by arranging a multiplicity of storage devices (e.g., hard disk drive (hereinafter, "HDD")) into an array and provides a storage area based on RAID (Redundant Array of Independent (or Inexpensive) Disks), for example. At least one logical volume (hereinafter, "volume") is formed on a physical storage area provided by a storage device group and this volume is provided to a host computer (hereinafter, "host"). The host transmits predetermined commands to the storage system to write/read data to/from the volume.

The above volume is a unit of the logical storage area provided by the storage device group, and a logical unit (LU) recognized as a unit logical storage area by the host is generated by setting a logical storage area created by one or a plurality of volumes such that the area becomes identifiable from the host.

Improvement in performance has been required for storage systems. PTL 1 discloses a technology related to higher performance of a storage system. Specifically, PTL 1 discloses a technology of preliminarily determining microprocessor packages (hereinafter, "MPPK") responsible for respective volumes in a control unit executing data processes (such as writing and reading of data) in the volumes to store control information necessary for the processes in local memories within the MPPK. PTL 1 also discloses a technology of changing MPPK responsible for a process of a certain volume to another MPPK.

CITATION LIST

Patent Literature

PTL 1: Japanese Patent Application Laid-Open Publication No. 2008-269424

SUMMARY OF INVENTION

Technical Problem

A storage system has various storage functions utilizing a plurality of volumes. For example, there is a volume copy function that copies data stored in one volume into another volume. The volume copy function is a process of correlating two volumes, i.e., a copy source and a copy destination, to copy data from the source volume to the destination volume and includes a remote copy process, for example.

If a technology of preliminarily determining MPPK responsible for a data process related to a certain volume is applied to a storage function, two methods are mainly conceived as a method of implementing the storage function. A first method is to make the same MPPK responsible for a plurality of volumes associated by the storage function. A second method is to coordinate a plurality of MPPKs with each other to execute a process (such as copying data from a source volume to destination volume).

Although the first method has an advantage that no overhead is generated due to the coordination of MPPKs, one MPPK takes responsibility for a multiplicity of volumes and costs may be concentrated on a certain MPPK. Although the numbers of volumes assigned to MPPKs can be equalized in the second method, coordination overhead between MPPKs may not be eliminated. As above, each of the methods has both merit and demerit. A suitable method is different depending on specifications and operations of the storage function.

If a method of preliminarily determining MPPK responsible for a data process related to a certain volume is employed, costs of MPPKs are fluctuated by changes in amount of IO issued by a host or by changing the responsible MPPK such that the same MPPK takes responsibility for volumes to which the storage function is applied. If the costs of MPPKs are fluctuated, the costs of the MPPKs may be equalized by changing the responsible MPPK for volumes. However, the technology disclosed in PTL 1 gives no consideration to "association between volumes due to setting of the storage function" and "processing costs of the storage function". Therefore, the following problem may occur.

(1) If the same MPPK is responsible for a plurality of volumes associated due to the storage function, only the MPPK responsible for some of the plurality of volumes is changed and the performance of the storage function may deteriorate. For example, when the same responsible MPPK is defined for a plurality of volumes due to a storage function suitable for the above first method, if the MPPK responsible for some of the volumes is changed, the process must be implemented with the second method which involves communications between MPPKs.

(2) If the MPPK responsible for all the volumes associated by a storage function suitable for the first method is changed without considering the process cost of the storage function, the new responsible MPPK may be overloaded.

The present invention was conceived to solve the above and other problems and it is therefore one object of the present invention to provide a storage system and a processing efficiency improving method of the storage system capable of preventing increase in communication overhead of a processor executing input/output processes for a plurality of logical storage areas included in the storage system to improve the processing efficiency of the storage system.

Solution to Problem

One aspect of the present invention for achieving the above and other objects provides a storage system having a storage device that includes a storage medium providing a plurality of unit logical storage areas used as data storage areas of an external apparatus and a plurality of processing devices communicatively coupled to the storage device to execute data IO processes for the unit logical storage areas from the external apparatus, the system comprising a responsible processing device retaining unit that retains the unit logical storage areas and the processing devices executing the data IO processes of the unit logical storage areas in a correlated manner, a storage function retaining unit that retains the unit logical storage areas and storage function information that is information set for the unit logical storage areas to indicate the usage aspects of the unit logical storage areas in a correlated manner, and a processing device changing unit that acquires from the responsible processing device retaining unit the processing device responsible for data processes related to the logical storage areas based on the storage function set for the unit logical storage areas acquired from the storage function retaining unit for the unit logical storage areas to determine whether the same processing device is responsible for the unit logical storage areas, the processing device changing unit changing the processing device responsible for different one of the unit logical storage areas such that any one of the processing devices responsible for the unit logical storage areas becomes responsible for the different one of the unit logical storage areas if it is determined that the same processing device is not responsible.

Advantageous Effects of Invention

The present invention can provide a storage system and a processing efficiency improving method of the storage system capable of preventing increase in communication overhead of a processor executing input/output processes for a plurality of logical storage areas included in the storage system to improve the processing efficiency of the storage system.

BRIEF DESCRIPTION OF DRAWINGS

FIG. 12 is a diagram of an example of a local copy table 2213.

FIG. 16 is a diagram of an example of an extended volume table 2214 of the Example 1.

FIG. 20 is a diagram of an example of a remote copy table 2215.

FIG. 23 is a diagram of an example of a responsible MPPK table for remote copy 2216 managing responsible MPPKs of remote copy groups.

FIG. 26 is a diagram of an example of an MPPK usage rate table 2217.

FIG. 27 is a diagram of an example of a processing cost table 2218 storing processing costs of various processes.

DESCRIPTION OF EMBODIMENTS

Preferred embodiments of the present invention will now be described in terms of the examples with reference to the accompanying drawings.

Example 1

An information processing system 1 of Example 1 of the present invention will be described with reference to FIGS. 1 to 22. A system configuration of the information processing system 1 will be described with reference to FIG. 1. Control information (tables) necessary for a storage system 200 included in the information processing system 1 will be described with reference to FIGS. 2 to 7. A process of changing a responsible MPPK of a volume will be described with reference to FIGS. 7 to 10. Finally, description will be made of a schematic of storage functions provided by the storage system, a process of changing a responsible MPPK of a volume applied with a storage function, and a process of changing a responsible MPPK for a remote copy group (described later) with reference to FIGS. 11 to 22.

System Configuration of Information Processing System 1

Figure 1:
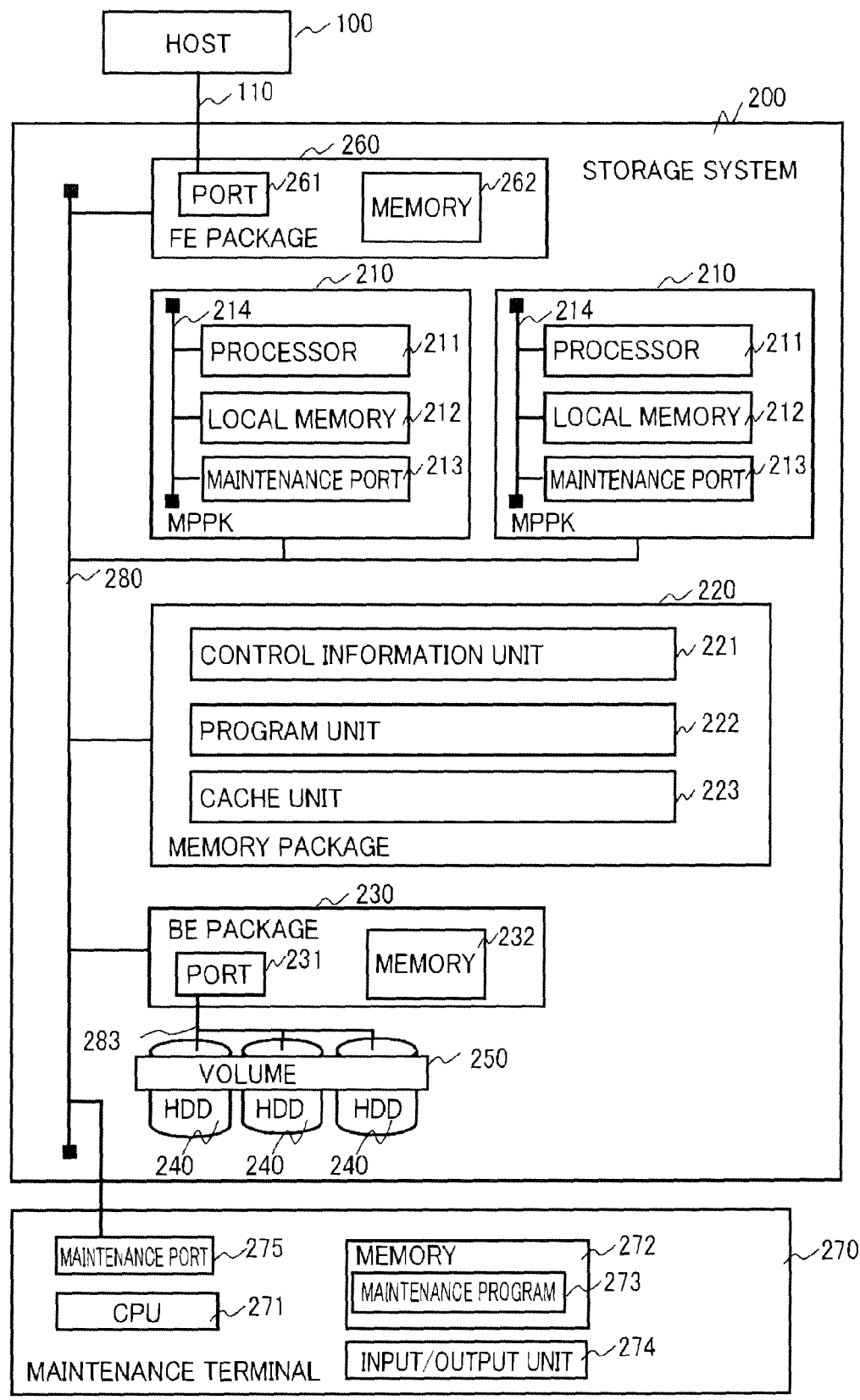
FIG. 1 is a diagram of an exemplary configuration of an information processing system 1 and a storage system 200 according to one embodiment of the present invention.

FIG. 1 depicts an overall configuration of the information processing system 1 of this example. The information processing system 1 includes a host 100 and the storage system 200. The storage system 200 is an apparatus that includes a storage medium providing a storage area for storing data to be processed by the host 100 as described later. The host 100 and the storage system 200 are coupled through a network 110. The network 110 is SAN (Storage Area Network), for example. A communication program such as Fiber Channel may be employed.

Host 100

The host 100 is an external apparatus and a computer running suitable OS (Operation System) such as UNIX (registered trademark) and is an apparatus that executes, for example, application software such as a database management system on the OS to perform predetermined business processes. Data used for the business processes executed by the host 100 is partially or entirely stored in a storage area provided by the storage system 200. The host 100 issues a read request and a write request to the storage system 200 with the use of the network 110 to write and read data stored in the storage system 200.

Figure 2:
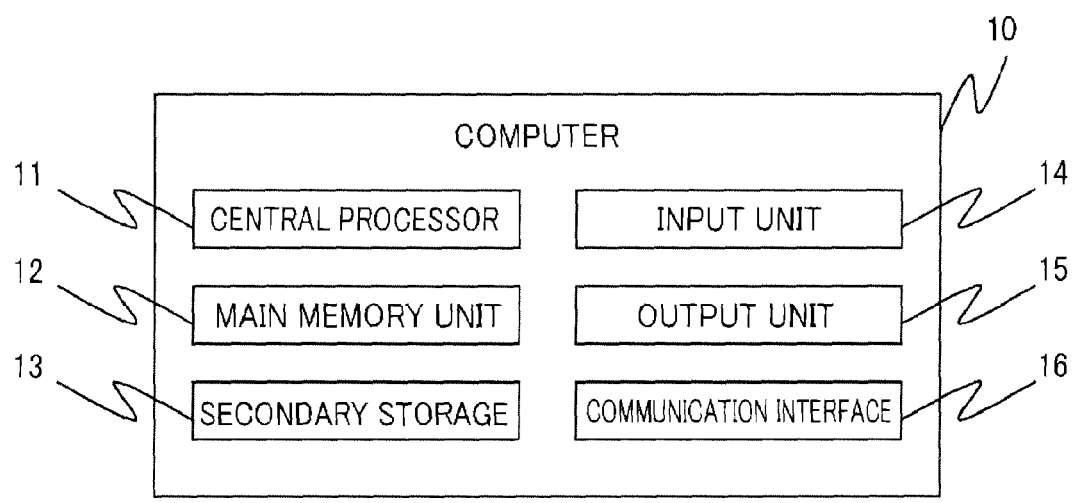
FIG. 2 is a diagram of an exemplary configuration of a computer 10 usable as a host 100.

FIG. 2 depicts an exemplary configuration of a computer 10 usable as the host 100. The computer 10 includes a central processor 11 (e.g., CPU (Central Processing Unit) or MPU (Micro Processing Unit), hereinafter, for simplicity, "CPU"), a main memory unit 12 (e.g., RAM (Random Access Memory) or ROM (Read Only Memory)), a secondary storage 13 (e.g., HDD), an input unit 14 accepting operations and inputs from a user (e.g., a keyboard and a mouse), an output unit 15 (e.g., a liquid crystal monitor), and a communication interface 16 (e.g., NIC (Network Interface Card) and HBA (Host Bus Adapter)) that implements communication with another apparatus.

Maintenance Terminal 270

A maintenance terminal 270 will now be described. The maintenance terminal 270 is a terminal for monitoring an operation state of the storage system (described later) or for giving an operational instruction necessary for maintenance, for example, and is SVP (SerVice Processor), for example.

The maintenance terminal 270 includes a maintenance port 275, a CPU 271, a memory 272, and an input/output unit 274 as shown in FIG. 1 and these units are communicatively coupled to each other through an internal network. The maintenance port 275 is coupled to a maintenance port 213 located in an MPPK 210 of the storage system 200 (described later) and is a port used for acquiring operation information from the MPPK 210 or transmitting a maintenance operation instruction to the MPPK 210.

The memory 272 stores a maintenance program 273 for executing processes related to the MPPK 210, and the CPU 271 reads and executes the maintenance program 273 from the memory 272 to implement the maintenance associated with the MPPK 210. The memory 272 is also used for storing information acquired from the MPPK 210.

The input/output unit 274 includes an input unit such as a keyboard and a mouse for accepting operations and inputs from a user and an output unit such as a display device for displaying to a user the operation information of the storage system 200 acquired from the MPPK 210. The maintenance terminal 270 is coupled to the maintenance port 213 of the MPPK 210 through an internal network 280 of the storage system 200.

Storage System 200

The configuration of the storage system 200 of this example will now be described with reference to FIG. 1. The storage system 200 of this example mainly includes a front-end package 260 (hereinafter, "FE package"), a microprocessor package 210 (MPPK), a memory package 220, a backend package 230 (hereinafter, "BE package"), and disk devices (storage devices) 240 and these units are communicatively coupled to each other through the internal network 280.

The storage system 200 may be configured to include pluralities of the FE packages 260, the memory packages 220, the BE packages 230, and the disk devices 240 and the three or more MPPKs 210.

The FE package 260 has a communication port 261 and a memory 262. The communication port 261 is coupled to a port (the communication interface 16 in an example of FIG. 8) used for the host 100 issuing IO requests to the storage system 200 and may accept a write request and a read request from the host 100. The port of the host 100 and the port 261 may be coupled directly through the network 110 or may be coupled indirectly via one or more switches, etc.

The memory 262 is made up of RAM, for example, and temporarily stores read and write requests received from the host 100, the information of the MPPK 210 processing the requests (the MPPK responsible for data processes related to the requested volume), the data transferred from the host 100, and the data to be transferred to the host 100. The FE package 260 may include pluralities of the ports 261 and the memories 262.

The MPPK 210 is a processing unit and includes a processor 211, a local memory 212 and the maintenance port 213, which are communicatively coupled to each other through a network 214. The one MPPK 210 may include pluralities of the processors 211, the local memories 212 and the maintenance ports 213. A dual core processor or a quad core processor may be employed as the MPPK 210 and, in this case, the cores mounted in the processor packages correspond to the processors 211.

The processor 211 is a device that reads and executes a program stored in a program unit 222 of the memory package 220 (described later) to execute a process such as write and read requests from the host 100.

The local memory 212 is made up of RAM, for example, and is used as a cache memory for storing temporarily data of the program executed by the processor 211 and storing data (such as control information described later, business data, and programs) stored in the HDD 240 and the memory 220. Since the local memory 212 is located closer to the processor 211 than the memory package 220 and the disk devices 240, the processor 211 can access the local memory 212 at higher speed.

The maintenance port 213 is coupled to the maintenance port 275 of the maintenance terminal 270 through the network 280. The maintenance port 213 is a communication port used for transmitting the operation information of the MPPK 210 to the maintenance terminal 270 or accepting a maintenance operation instruction from the maintenance terminal 270.

The memory package 220 has a control information unit 221, the program unit 222, and a cache unit 223. The program unit 222 records programs for implementing a process with the storage system 200. The control information unit 221 records the control information utilized by the programs of the program unit 222 in table format, for example. The programs stored in the memory package 220 and the control information utilized by the programs are read from the memory package 220 and processed by the processor 211 of the MPPK 210. Details of the programs recorded in the program unit 222 and the control information recorded in the control information unit 221 will be described later.

The cache unit 223 temporarily stores data to be stored in the HDDs 240 and data read from the disk devices 240. Since the memory package 220 is made up of RAM, etc., i.e., the storage medium faster than the disc devices 24, the processes such as read and write requests from the host 100 may be accelerated by storing into the cache unit 223 the frequently used data, etc., stored in the disk devices 240 as compared to the case of normally accessing the disk devices 240 for all the data IO. The memory package 220 may be multiplexed so as to avoid the data loss at the time of the occurrence of failure.

The BE packages 230 has a port 231 and a memory 232. The port 231 is coupled to the disk devices 240 through a network 283 and is a communication port used for writing the write data from the host 100 into the disk devices 240 and reading data from the disk devices 240 in accordance with a read request from the host 100. The memory 232 temporarily stores data to be transferred to the disk devices 240 and data read from the disk devices 240. The BE packages 230 may have two or more ports 231 and memories 232.

The disk devices 240 are made up of, for example, hard disk drives ("HDDs") in this example and are physical storage devices that provide logical storage areas for storing data by application software, etc., executed by the host 100.

The one or more disk devices 240 may be organized on the basis of a parity group and operated as RAID (Redundant Array of Independent (or Inexpensive) Disks) to improve reliability. The parity group consisting of the disk devices 240 is divided into one or more logical storage areas, each of which is defined as a volume 250 that is a unit logical storage area, as described above.

Although the HDD 240 is used as the physical storage medium in this example, the recording medium may be employed as a flash memory, a solid state drive ("SSD"), or an optical disk such as DVD.

Configuration of Memory Package 220

Figure 3:
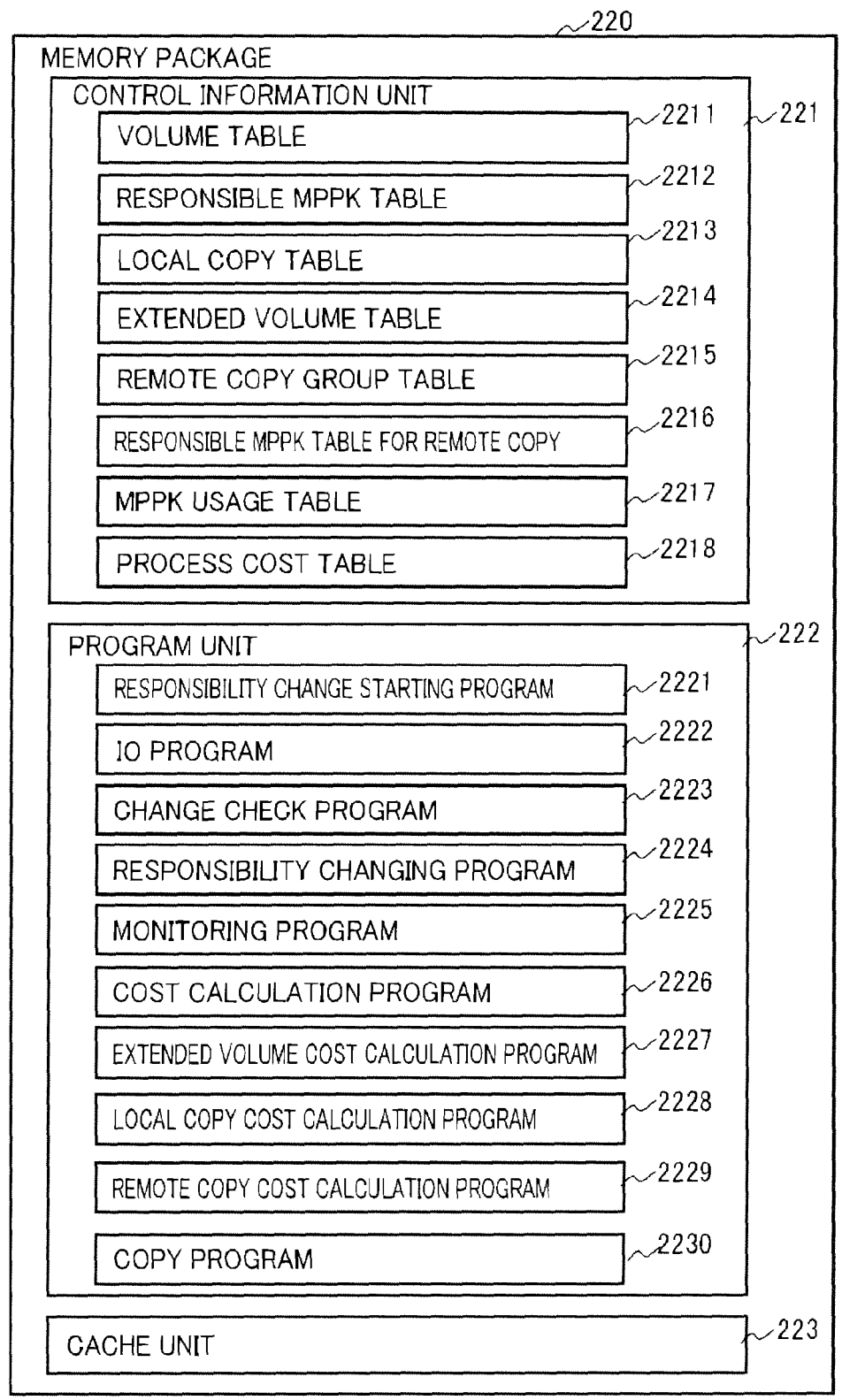
FIG. 3 is a diagram of an example of a control information unit, a program unit, and a cache unit stored in a memory package 220 of the storage system 200.

FIG. 3 depicts an exemplary configuration of the memory package 220. The control information unit 221 of the memory package 220 stores in table format the control information used by the storage system 200 for executing the data IO processes from the host 100 and the processes related to the present invention. In this example, the control information unit 221 stores a volume table 2211, a responsible MPPK table 2212, a local copy table 2213, an extended volume table 2214, a remote copy group table 2215, a responsible MPPK table for remote copy 2216, an MPPK usage rate table 227, and a processing cost table 2218.

The program unit 222 stores programs executed by the MPPK 210. In this example, the program unit 222 stores a responsibility change starting program 2221, an IO program 2222, a change check program 2223, a responsibility changing program 2224, a monitoring program 2225, a cost calculation program 2226, an extended volume cost calculation program 2227, a local copy cost calculation program 2228, and a remote copy cost calculation program 2229. These programs may collectively be referred to as a processing unit (MPPK) changing unit. Details of the tables and programs will be described later with reference to the related drawings. The cache unit 223 is used as a primary storage area of data given and received between the host 100 and the disk devices 240 as described above and will not be described in detail.

Control Information Unit 221

The tables stored in the control information unit 221 of the memory package 220 will now be described. FIG. 3 depicts an example of the volume table 2211 stored in the control information unit 221.

The volume table 2211 stores attribute information related to the volumes 250 that is the unit logical storage areas provided by the disk devices 240. The volume table 2211 includes a volume number field 22111, a function bit field 22112, a using job information field 22113, a write count field 22114, and a read count field 22115. For simplicity, the information itself recorded in the fields set in tables such as the volume table 2211 will hereinafter be represented with the same reference numerals as those added to the fields recording the information, for example, "volume number 22111".

The volume number field 22111 records the volume number that is an identification code for uniquely identifying each of the volumes 250 within the storage system 200. The volume numbers are serially added as the unique numbers by the MPPK 210 to a plurality of the volumes 250 provided by the disk devices 240.

The function bit field 22112 records a function bit (function information) representative of information of the storage function (described later) which is applied to the volume 250 identified by the volume number 22111. The using bit field 22113 records a using bit that is information representative of whether a job using the volume 250 identified by the volume number 22111 exists. If a job using the volume 250 exists, the using bit field 22113 records a job number given to the job.

The write count field 22114 records the write count that is information representative of the number of times the volume 250 identified by the volume number 22111 receives the write request from the host 100 within a unit time period. The read count field 22115 records the read count that is information representative of the number of times the volume 250 identified by the volume number 22111 receives the read request from the host 100 within a unit time period. The write count 22114 and the read count 22115 may be configured such that the MPPK 210 responsible for the volume 250 counts the write count and the read count received in the previous unit time period to update the records in the write count field 22114 and the read count field 22115 at appropriate time intervals.

Figures 4, 5, 6:
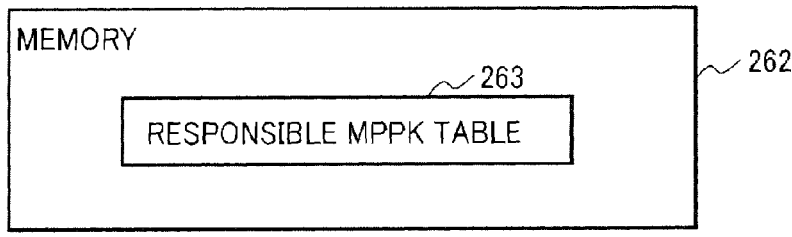
FIG. 4 is a diagram of an example of a volume table 2211.
FIG. 5 is a diagram of an example of control information stored in a memory 262.
FIG. 6 is a diagram of an example of a responsible MPPK table 263 stored in the memory 262.

In the example of FIG. 4, the volume 250 having the volume number 22111 of 1 has no record in the function bit field 22112 since the storage function is not applied thereto, and the using job number field 22113 records the job number of 1, 2, and 5 to indicate that the volume is used by these jobs. As shown in the write count field 22114 and the read count field 22115, the volume 250 having the volume number 22111 of 1 has received the write request 200 times and the read request 100 times from the host 100. The information recorded in the fields of the volume table 2211 is updated on a timely basis by the MPPK 210 responsible for the volumes 250.

The relationship between a certain volume 250 and the MPPK 210 responsible for the process of the volume 250 will now be described. In the storage system 200 of this example, the MPPK 210 responsible for the data process (such as an IO process from the host 100 to the volume 250) is preliminarily determined for each of the volumes 250. The MPPK 210 accessing the control information necessary for a certain data process of the volume 250 may be limited to one MPPK by preliminarily determining the MPPK 210 responsible for the data process of each or the volumes 250.

If the MPPK 210 executing the data process for the certain volume 250 is preliminarily determined, the process of the volume 250 may be accelerated since communication with another one of the MPPKs 210 is not necessary and the control information necessary for the process may be stored in the local memory of the one MPPK 210. For example, if the local memory 212 is provided with information indicative of what address the dirty data (data written into the cache unit 223 and not yet destaged into the disk device 240) of the data of the volume 250 is located at, or with a copied bitmap indicative of differential data in a local copy function (described later), the process of the MPPK 210 accessing to these pieces of information may be accelerated.

When the responsible MPPK 210 responsible for the certain volume 250 is determined, upon receipt of IO from the host 100, the FE package 260 must allocate the IO request to the responsible MPPK 210 based on the information of the IO destination volume 250. The FE package 260 retains a responsible MPPK table 263 as information for implementing the allocation.

FIG. 5 depicts an exemplary configuration of the memory 262. The memory 262 stores the responsible MPPK table 263 used in the process of the FE package 260. FIG. 6 depicts an example of the responsible MPPK table 263.

The responsible MPPK table 263 includes a volume number field 2631 and a responsible MPPK number field 2632. The volume number field 2631 records the volume number that is the same identification code for the volume 250 as the volume number field 22111 of the volume table 2211.

The responsible MPPK number field 2632 records the responsible MPPK number that is the identification number of the MPPK 210 responsible for the process (such as an IO process to the volume 250) of the relevant volume 250 identified by the volume number 2631. The responsible MPPK number 2632 is an identification number uniquely added to each of the MPPKs 210 by a system administrator in advance before the start of operation of the storage system 200, for example. If the FE package 260 receives IO from the host 100, the FE package 260 searches the responsible MPPK table 263 by the volume number 2631 given to the IO object volume 250 to acquire the MPPK number 2632 of the MPPK 210 responsible for the IO object volume 250, and transmits the IO to the corresponding MPPK 210.

Figures 7, 8:
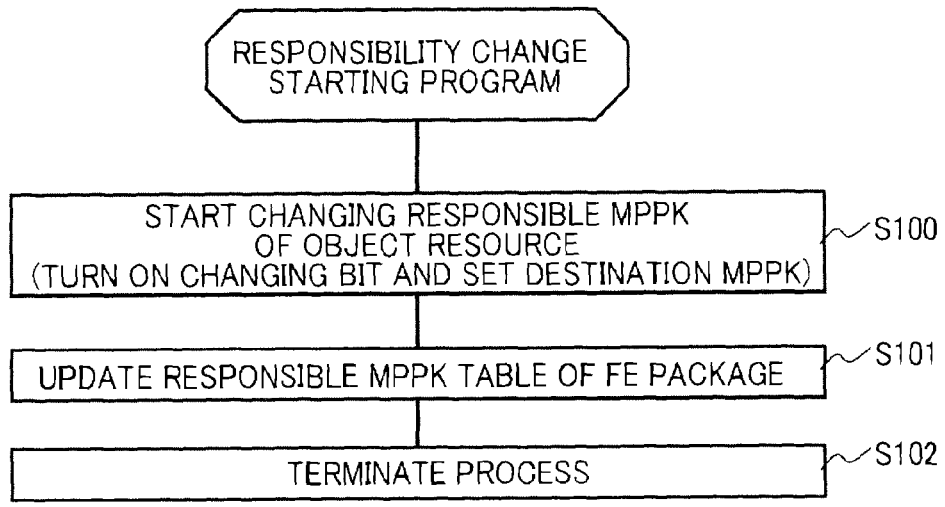
FIG. 7 is a diagram of an example of a responsible MPPK table 2212 stored in a control information unit 221.
FIG. 8 is a diagram of an example of a process of a responsibility change starting program of Example 1.

The responsible MPPK table 2212 is also retained in the control information unit 221 of the memory package 220. FIG. 7 depicts an example of the responsible MPPK table 2212 in the control information unit 221.

The responsible MPPK table 2212 in the control information unit 221 includes a volume number field 22121, a responsible MPPK number field 22122, a changing bit field 22123, and a destination MPPK number field 22124. The volume number field 22121 and the responsible MPPK number field 22122 correspond to the volume number field 2631 and the responsible MPPK number field 2632 of the responsible MPPK table 263 of FIG. 6.

Information recorded in the changing bit field 22123 and the destination MPPK number field 22124 is information necessary when the responsible MPPK 210 is changed. The changing bit field 22123 records a changing bit that is information indicating that the responsible MPPK 210 for the volume 250 identified by the corresponding volume number 22121 is in the changing process. If a value of the changing bit 22123 is "ON", this indicates that the changing process is being executed for the responsible MPPK 210, and if the value is "OFF", this indicates that the responsible MPPK 210 is not in the changing process. The destination MPPK number field 22124 records the destination MPPK number that is the number of the MPPK 210 newly defined as the responsible MPPK 210 by the responsible MPPK changing process.

The example of FIG. 7 indicates that the responsible MPPK of the volume 250 having the volume number 22121 of 1 is being changed from the MPPK 210 having the MPPK number of 1 to the MPPK 210 having the MPPK number of 2. Since the destination MPPK 210 does not exist if the changing bit 22123 is "OFF", a "-" sign is recorded in the destination MPPK number field 22124 to indicate that the destination MPPK 210 does not exist.

The changing bit 22123 is used to mange whether the responsible MPPK 210 for the certain volume 250 is being changed because of the following reason. When the responsible MPPK 210 for the certain volume 250 is changed from the MPPK 210 having the MPPK number of 1 (hereinafter, "MPPK 1") to the MPPK 210 having the MPPK number of 2 (hereinafter, "MPPK 2"), the MPPK 1 may have a process being executed. If the MPPK 2 starts the new process without waiting for the completion of the process being executed by the MPPK 1, both the MPPK 1 and the MPPK 2 would have respective pieces of the control information for the process being executed and update the control information. Therefore, the control information recorded in the local memories 212 of the both MPPKs may be in a mismatched state. To avoid the occurrence of this mismatched state, the changing bit 22123 is provided to make the MPPK 210 being changed identifiable.

In the example of FIG. 7, while a process being executed remains in the MPPK 1, the changing bit 22123 is set to ON. While the changing bit 22123 is ON, the responsible MPPK number 22122 of the responsible MPPK table 2212 is not changed and the new process in the destination MPPK 210 (the MPPK 210 having the destination MPPK number of 2 in the example of FIG. 7) is controlled so as not to be executed.

If new IO requests for the certain volume 250 are continuously issued to the source MPPK 210, the process being executed in the source MPPK 210 will not be completed. To prevent this situation, the new IO for the corresponding volume 250 is configured to be transmitted to the destination MPPK 210 by the FE package 260. A responsible MPPK 210 changing process will be described in detail with reference to FIGS. 8 to 11.

Responsible MPPK Changing Process

Examples of the changing process of the responsible MPPK 210 and the IO process during the change will be described with reference to FIGS. 8 to 11. These processes are implemented by executing the responsibility change starting program 2221, the IO program 2222, the responsibility change check program 2223, and the responsibility changing program 2224 stored in the program unit 222 of the memory package 220.

FIG. 8 depicts an example of a process flow of the responsibility change starting program 2221. The responsibility change starting program 2221 is a program updating the changing bit 22123 etc. recorded in the responsible MPPK table 2212 to start the changing process of the responsible MPPK 210. If a performer of a process is described as a program in the following description, this means that the program is executed by the processor 211 to implement the relevant process.

The responsibility change starting program 2221 is activated by input from the maintenance terminal 270 or access from another program. The responsibility change starting program 2221 receives the volume number 22121 of the volume (hereinafter, "change object volume") 250 having the responsible MPPK 210 to be changed and the MPPK number 22124 of the destination MPPK 210 (new responsible MPPK 210).

The responsibility change starting program 2221 specifies an entry for the change object volume 250 from the responsible MPPK table 2212. The responsibility change starting program 2221 sets the changing bit 22123 of the entry to ON and registers the MPPK number 22124 of the destination MPPK 210 specified as the destination MPPK 210 (S100).

The responsibility change starting program 2221 updates the responsible MPPK table 263 of the FE package 260 (S101) to terminate the process (S102). Specifically, the MPPK number 22124 of the destination MPPK 210 is stored in the responsible MPPK number field 2632 of the responsible MPPK table 263. As a result, the new IO issued for the change object volume 250 is transmitted to the destination MPPK 210 by the FE package 260.

Figure 9:
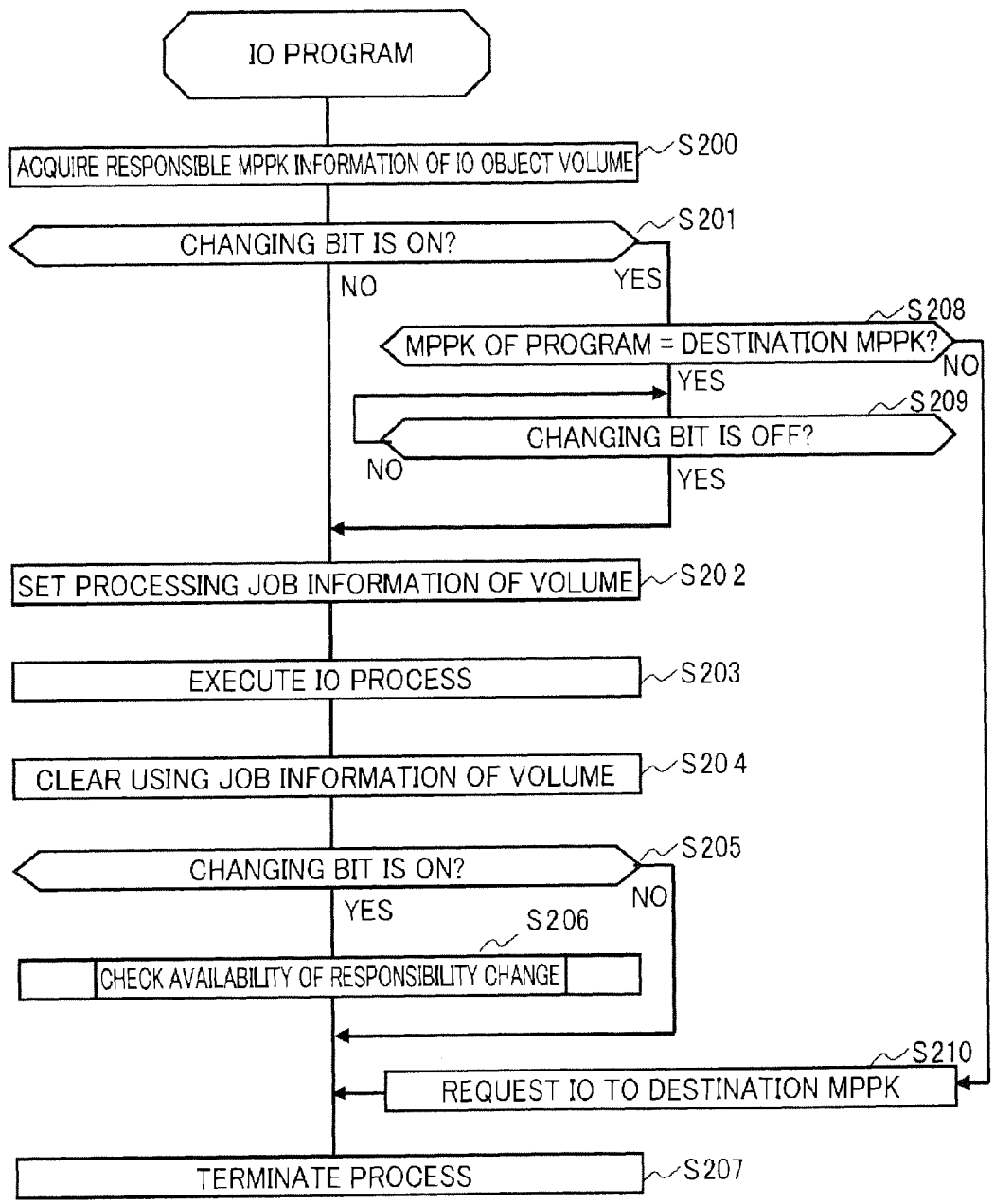
FIG. 9 is a diagram of an example of a process of an IO program of the Example 1.

The IO process before changing the responsible MPPK 210, the IO process during the change, and the IO process being executed in the source MPPK 210 at the start or the change will now be described with reference to FIG. 9.

The IO process before changing the responsible MPPK 210 will first be described. The IO program 2222 refers to the responsible MPPK table 2212 and acquires information of the responsible MPPK 210 for the IO object volume 250 (S200) to check whether the changing bit 22123 is ON (S201). Before the change, the changing bit 22123 is OFF (S201, No) and thus the process goes to S202.

The IO program 2222 registers the job number of a job to be executed in the using job information field 22113. The job number is the number allocated each time a job is activated in the storage system 200. The respective job numbers of jobs concurrently executed in the storage system are different numbers. The using job information 22113 is registered to prevent the responsible MPPK 210 for the volume 250 from being changed during the usage of the volume 250.

The IO program 2222 then executes the IO process specified to the volume 250 (S203) and deletes the corresponding job number from the using job information field 22113 (S204).

The IO program 2222 refers to the responsible MPPK table 2212 and acquires information of the responsible MPPK 210 for the IO object volume 250 to check whether the changing bit 22123 is ON (S205). This is performed for executing a process of S206 if the changing of the responsible MPPK 210 is started during the execution of IO. The process of S206 will be described later. In the case of the IO process before the change, the changing bit 22123 is OFF and the process is terminated (S207).

The IO process during the change of the responsible MPPK will now be described. The IO received by the MPPK 210 during the change of the responsible MPPK 210 is considered to include two types of IO, i.e., the IO allocated to the source MPPK 210 by the FE package 260 and the IO allocated to the destination MPPK 210 by the FE package 260.

If the responsible MPPK 210 is being changed at the process S201 (S201, Yes), the IO program 2222 goes to S208. At S208, the IO program 2222 compares the MPPK number of the MPPK 210 of the program with the destination MPPK number 22124 of the responsible MPPK table 2212 (S208). If the MPPK numbers are different (S208, No), the IO is identified as IO allocated to the source MPPK 210 by the FE package 260.

On the other hand, if the MPPK number of the MPPK 210 of the program is the same as the destination MPPK number 22124 of the responsible MPPK table 2212 (S208, Yes), the IO is identified as IO allocated to the destination MPPK 210 by the FE package 260. In the case of the IO allocated to the destination MPPK 210, the IO program 2222 repeatedly refers to the changing bit 22123 (S209) to wait for the completion of the changing (S209, No). If the changing bit 22123 is OFF (S209, Yes), it is determined that the changing is completed and the IO program 2222 executes S207 from S202 to complete the IO process.

On the other hand, if it is determined that the MPPK number of the MPPK 210 of the program is not identical to the destination MPPK number 22124 of the responsible MPPK table 2212 at the process S208 (S208, No) and the IO is identified as the IO allocated to the destination MPPK 210, the IO program 2222 makes a request for the IO process to the destination MPPK 210 (S210). The IO program 2222 of the destination MPPK 210 receiving the request executes S200 to S210 to process the IO.

If all the processes in execution in the destination MPPK 210 are completed, the process in the destination MPPK 210 must be started by writing the destination MPPK number 22124 into the responsible MPPK number field 22122 of the responsible MPPK table 2212 and turning the changing bit 22123 OFF. To implement this operation, it is detected that the source MPPK 210 no longer has job using the change object volume 250 to update the responsible MPPK number and the changing bit of the responsible MPPK table 2212.

The checking of the absence of job using the change object volume 250 may be triggered by two triggers, which are an IO completion trigger and a trigger independent of IO. A process for checking from the IO completion trigger is S206. If it is determined that the changing bit 22123 is ON at S205 (S205, Yes), the IO program 2222 activates the responsibility change check program 2223 (S206).

If the responsible MPPK 210 is changed between S202 and S205, the changing bit 22123 may be set to ON during the execution of S205. In the case of the trigger independent of IO, a monitoring program (not shown) etc. periodically refers to the responsible MPPK table 2212 and activates the responsibility change check program 2223 for the volume 250 having the changing bit 22123 set to ON.

Figure 10:
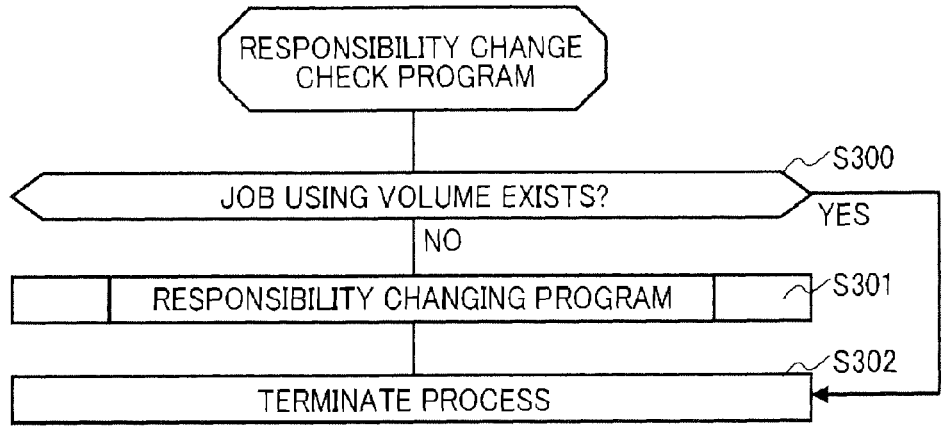
FIG. 10 is a diagram of an example of a process of a responsibility change check program of the Example 1.

FIG. 10 depicts an example of a process flow of the responsibility change check program 2223. The responsibility change check program 2223 is a program for checking whether the responsible MPPK 210 for the change object volume 250 is able to be changed. Specifically, the responsibility change check program 2223 determines the availability of the change depending on whether a job using the change object volume 250 exists.

Firstly, the responsibility change check program 2223 checks whether a job using the change object volume 250 exists (S300). This process is implemented by referring to the using job information field 22113 of the volume table 2211. If a job using the change object volume 250 exists (S300, Yes), the responsible MPPK 210 is unable to be changed and, therefore, the responsibility change check program 2223 terminates the process (S302). On the other hand, if a job using the change object volume 250 does not exist (S300, No), the responsibility change check program 2223 calls the responsibility changing program 2224 (S301) and terminates the process (S302).

Figure 11:
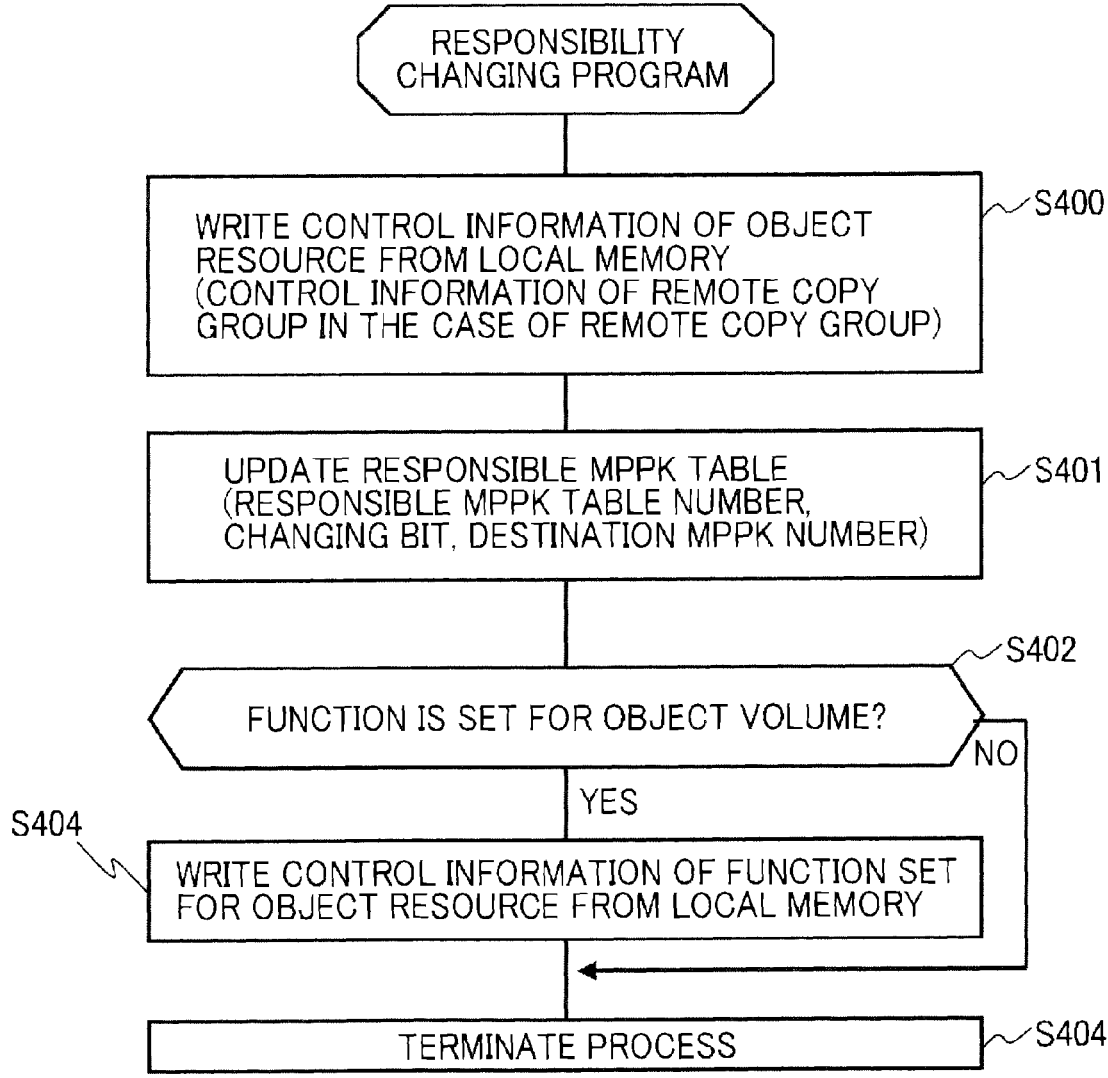
FIG. 11 is a diagram of an example of a process of the responsibility change program of the Example 1.

FIG. 11 depicts an example of a process flow of the responsibility changing program 2224. The responsibility changing program 2224 is a program for actually changing the responsible MPPK 210 for the change object volume 250 by updating the responsible MPPK number 22122, the changing bit 22123, and the destination MPPK number 22124 in the responsible MPPK table 2212. Executing the process of the responsibility changing program 2224 enables the process of the change object volume 250 to be started in the destination MPPK 210.

The responsibility changing program 2224 writes the control information about the change object volume 250 from the local memory 212 of the source MPPK 210 into the control information unit 221 of the memory package 220. This control information is information used when the MPPK 210 executes the data IO process for the volume 250 and includes information indicative of the address of the cache unit 223 storing dirty data of the object volume 250, for example.

The responsibility changing program 2224 then updates the responsible MPPK number 22122, the changing bit 22123, and the destination MPPK number 22124 in the responsible MPPK table 2212. For example, if the responsible MPPK 210 is changed from the MPPK 1 to the MPPK 2, the responsibility changing program 2224 changes the responsible MPPK number 22122 from 1 to 2, changes the changing bit 22123 from ON to OFF, and changes the destination MPPK number 22124 from 2 to "-", which is a sign meaning that the destination MPPK 210 does not exist (S401).

The responsibility changing program 2224 then determines whether any storage function is set in the object volume 250 (S402). If the storage function is set (S402, Yes), the responsibility changing program 2224 writes the control information about the storage function from the local memory 212 into the control information unit 221 of the memory package 220 (S403) and terminates the process (S404). If the function is not set, S404 is skipped to terminate the process (S404).

The process of changing the responsible MPPK 210 for the volume 250 applied with the storage function will hereinafter be described. The performance deterioration due to the change is avoided by executing the changing process of the responsible MPPK 210 with consideration that the storage function is set, as described above. A schematic of the storage functions in the storage system 200 of this example will first be described, and a problem in the architecture of determining the responsible MPPK 210 in advance and a changing method of the responsible MPPK 210 capable of eliminating the problem will now be described.

One of the storage functions is a local copy function. The local copy function is a function of creating a copy of the volumes 250 within the storage system 200. The local copy function correlates the two volumes 250, i.e., a primary volume (hereinafter, "PVOL") that is a copy source and a secondary volume (hereinafter, "SVOL") that is a copy destination. The PVOL and SVOL correlated as above are collectively referred to as a pair.

FIG. 12 depicts an example of the local copy table 2213 used for managing the relationship between the PVOL and the SVOL in the local copy function. The local copy table 2213 includes a pair number field 22131, a PVOL number field 22132, an SVOL number field 22133, and a copy amount field 22134. The pair number field 22131 records the pair number that is the number uniquely allocated to a pair of the PVOL and SVOL. The pair within the storage system 200 can be uniquely identified by using the pair number 22131. The PVOL number field 22132 records the volume number given to the PVOL. The SVOL number field 22133 records the volume number given to the SVOL. The copy amount field 22134 records the copy amount that is information indicative of an amount of data copied from the PVOL to the SVOL in the previous unit time period. The copy amount 22134 may be prescribed as an amount of data copied from the PVOL to the SVOL in previous one second, and it is recorded in the unit of MB/s in the example of FIG. 12.

The operation of the local copy function will briefly be described. It is hereinafter be assumed that the process described with the local copy function as a performer is implemented by the MPPK 210 executing the program implementing the local copy function. The same applies to other storage functions when a relevant storage function is described as a performer of a process.

The local copy function receives a local copy start instruction from the maintenance terminal 270 or the host 100. This instruction includes the volume numbers of the PVOL and the SVOL. When the instruction is received, the local copy function records the pair number 2131, the PVOL number 22132, the SVOL number 22133, and the copy amount 22134 into the local copy table 2213.

The local copy function provides a function of copying data of the PVOL at a certain time point to the SVOL and a function of keeping the data of the PVOL and the SVOL always identical.

A method of copying data of the PVOL at a certain time point to the SVOL will first be described. When receiving the copy execution instruction, the local copy function sequentially reads data from the start address of the PVOL toward the end of the PVOL and writes the data into the SVOL. When the copying to the end of the PVOL is completed, the copying is completed. To create a copy of the PVOL data at a certain time point in the SVOL with the above process, the write from the host 100 into the PVOL must be stopped once to copy the data.

Description will be made of a method of copying data while receiving the write into the PVOL from the host 100 without stopping the write to the PVOL. To implement such a copy process, the storage system 200 has a copied bitmap (not shown) in the control information unit 221 of the memory package 220, for example. This copied bitmap is information indicative of whether data stored at an address is copied to the SVOL for each address in the PVOL. In this example, a copied bitmap value of "OFF" for a certain address indicates that data is copied, and a value of "ON" indicates that data is not copied.

When starting the copy from the PVOL to the SVOL, the local copy function sets all the contents of the copied bitmap to "ON". When copying the data from PVOL to the SVOL, the local copy function changes the value of the copied bitmap to "OFF" for the address where the copy is completed. When a write request into the PVOL from the host 100 is received, a reference is made to the copied bitmap and if the copied bitmap value for the write address is "ON", the data of the write address is copied from the PVOL to the SVOL at the time point and the copied bitmap is changed to "OFF". After the copy from the PVOL to SVOL is completed, the write data from the host 100 is written into the corresponding address of the PVOL.

This enables the copy of the data stored in the PVOL at a certain time point before the reception of the write request to be created while receiving the write from the host 100.

A function of keeping the data of the PVOL and the SVOL always identical will now be described. As in the case of copying the data of the PVOL at a certain time point to the SVOL, the local copy function sequentially reads data from the start address of the PVOL toward the end of the PVOL and writes the data into the SVOL. The local copy function manages the copy status through the copied bitmap.

When the write request to the PVOL from the host 100 is received, the local copy function always keeps the data of the PVOL and the SVOL identical by writing the write data into both the PVOL and the SVOL rather than only the PVOL.

In another method, when the local copy function receives the write request, the write data is written into only the PVOL. Specifically, the local copy function writes the write data into the PVOL and changes the copied bitmap to "ON". The local copy function periodically searches a portion having a copied bitmap value of "ON" and copies the PVOL data corresponding to the portion to the SVOL.

As described above, the local copy function copies data from the PVOL to the SVOL at either the timing synchronized with the IO request from the host 100 or the timing independent of the IO request. The process of the local copy function is different between the case of the PVOL and the SVOL having the same responsible MPPK 210 and the case of the PVOL and the SVOL having the different responsible MPPKs 210.

Figure 13:
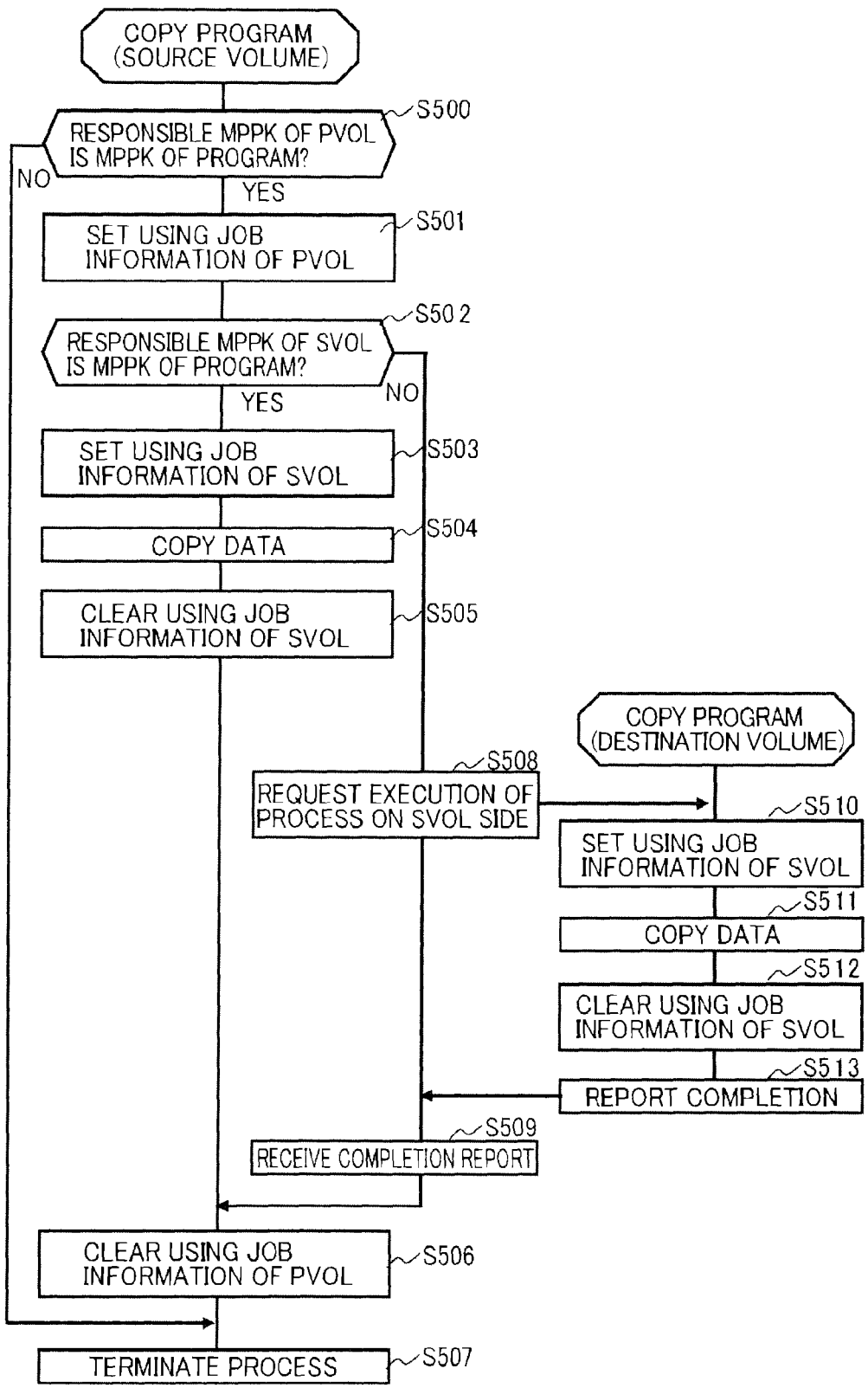
FIG. 13 is a diagram of an example of a process of a copy program.

A method of a copy process from the PVOL to the SVOL in the case of not changing the responsible MPPK 210 in this example will be described with reference to FIG. 13. A copy program 2230 shown in FIG. 13 is called by the IO program 2222, a program checking the above copied bitmap to activate the copy process, etc. The local copy function is implemented by the processor 211 of the storage system 200 executing the copy program 2230 stored in the program unit 222. Although the copy program 2230 of FIG. 13 is an example of being activated in the responsible MPPK 210 for the PVOL to execute the process while communicating with the responsible MPPK 210 for the SVOL as needed, the program may be activated in the MPPK 210 of the SVOL to execute the process while communicating with the responsible MPPK 210 for the PVOL as needed.

Firstly, the copy program 2230 refers to the responsible MPPK table 2212 to check whether the responsible MPPK 210 for the PVOL is the MPPK 210 of the program (S500). If it is determined that the MPPK 210 of the program is not the responsible MPPK 210 for the PVOL (S500, No), the process is completed (S507) and the copy program 2230 of FIG. 13 is reactivated in the responsible MPPK 210 for the PVOL.

If it is determined that the MPPK 210 of the program is the responsible MPPK 210 for the PVOL (S500, Yes), the copy program 2230 registers the job number of the copy program into the using job information field 22113 of the volume table 2211 of the PVOL (S501). The copy program 2230 then refers to the responsible MPPK table 2212 to check whether the responsible MPPK 210 for the SVOL is the MPPK 210 of the program (S502)

If it is determined that the MPPK 210 of the program is the responsible MPPK 210 for the SVOL (S500, Yes), the MPPK 210 of the program is the responsible MPPK 210 for both the PVOL and the SVOL and, therefore, the job number is registered in the using job information field 22113 of the volume table 2211 of the SVOL (S503) and data is copied from the PVOL to the SVOL (S504). After the copy is completed, the copy program 2230 deletes the job number from the job information fields 22113 of the SVOL and the PVOL (S505, S506) to terminate the process (S507).

The process will now be described for the case that the responsible MPPK 210 for the SVOL is different from the responsible MPPK 210 for the PVOL. If it is determined at S502 of FIG. 13 that the MPPK 210 of the program is not the responsible MPPK 210 for the SVOL (S502, No), the copy program 2230 makes a request for the process on the SVOL side to the responsible MPPK 210 for the SVOL and waits for a response from the responsible MPPK 210 for the SVOL (S508). The copy program 2230 is assumed to notify the responsible MPPK 210 for the SVOL of the address of data to be copied.

The copy program 2230 operated in the responsible MPPK 210 for the SVOL receives the request for the process on the SVOL side from the copy program 2230 operated in the responsible MPPK 210 for the PVOL and registers the job number in the using job information field 22113 of the volume table 2211 of the SVOL (S510) and copies data from the PVOL to the SVOL (S511). Finally, the copy program 2230 operated in the responsible MPPK 210 for the SVOL deletes the job number from the using job information field 22113 of the volume table 2211 of the SVOL (S512) and reports the completion of the copy process to the copy program 2230 operated in the responsible MPPK 210 for the PVOL (S513).

The copy program 2230 operated in the responsible MPPK 210 for the PVOL waiting after the execution of S508 receives the completion report from the copy program 2230 operated in the responsible MPPK 210 for the SVOL (S509) and deletes the job number from the using job information field 22113 of the volume table 2211 of the SVOL (S506) to terminate the process (S507).

As can be seen from the above description of the copy process of the local copy function, if the responsible MPPKs 210 are different between the PVOL and the SVOL, the MPPKs 210 must communicate at S508 and S513 of FIG. 13 and the performance may deteriorate. Since the volumes 250 to be associated are the two volumes 250 of the PVOL and the SVOL in the case of the local copy function, it is desirable to match the responsible MPPKs 210 for the PVOL and the SVOL as far as possible to avoid the communication between the MPPKs 210. The process from S508 to S513 of the copy program 2230 may be omitted by always matching the responsible MPPKs 210 for the PVOL and the SVOL.

A process of changing the responsible MPPK 210 for the volume 250 with the local copy function set in this example will now be described.

If the responsible MPPK 210 for the PVOL or the SVOL is changed without considering the setting status of the local copy function, the following problem occurs.

If the responsible MPPK 210 for the PVOL or the SVOL is changed, the process of S508 to S513 of FIG. 13 is always necessary when data is copied from the PVOL to the SVOL and the communication between the MPPKs 210 occurs and deteriorates the copy performance. To avoid this problem, when changing the responsible MPPK 210 for the PVOL, the responsible MPPK 210 for the SVOL must also be changed. Similarly, when changing the responsible MPPK 210 for the SVOL, the responsible MPPK 210 for the PVOL must also be changed.

Even if the responsible MPPK 210 is changed for both the PVOL and the SVOL, when the responsible MPPK 210 for the SVOL is changed between S501 and S502 of FIG. 13, the execution of the data copy temporarily becomes impossible. Therefore, in the case of the local copy function, when a job using the PVOL and the SVOL no longer exists, the responsible MPPKs 210 for the PVOL and the SVOL must be changed together.

Figure 14:
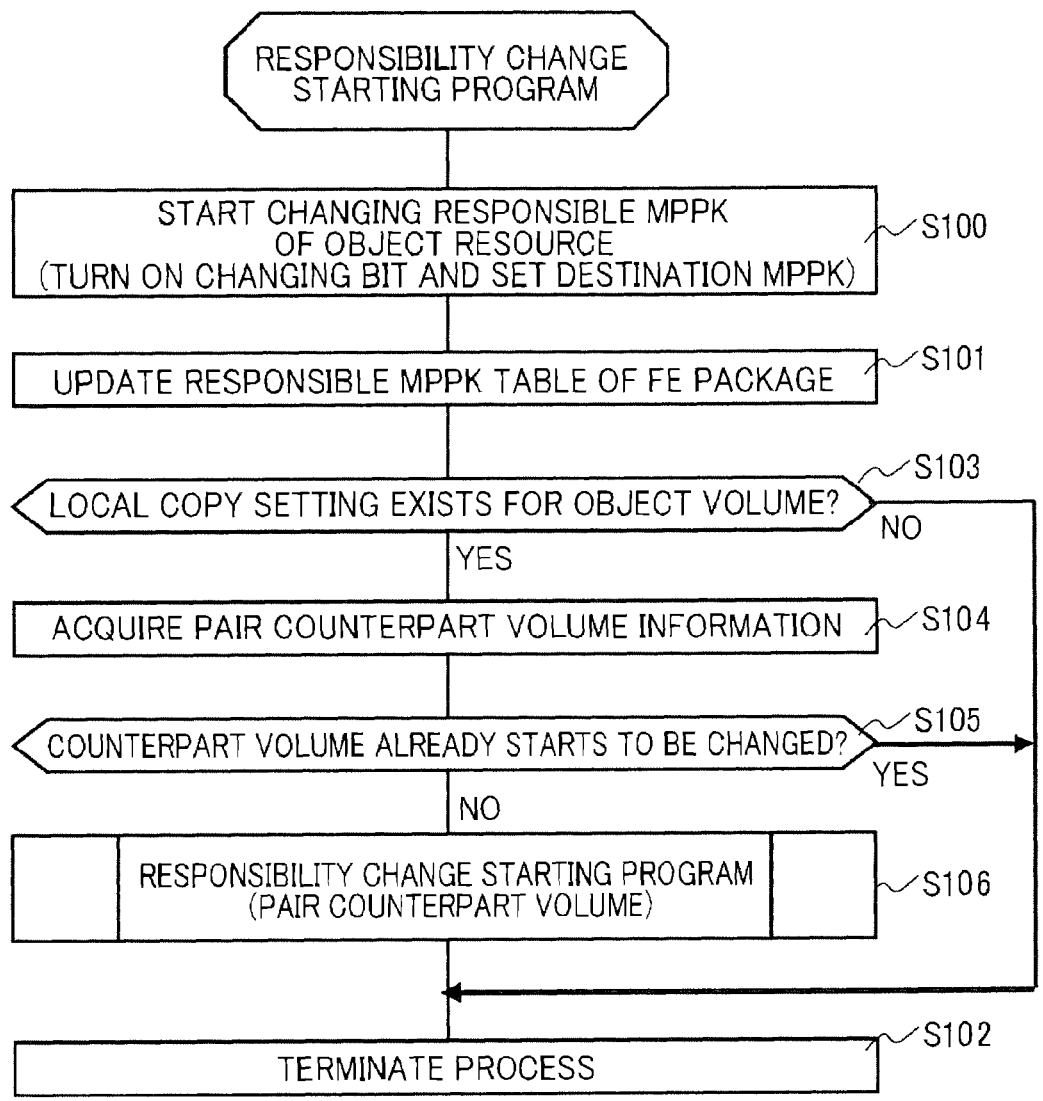
FIG. 14 is a diagram of an example of a process of the responsibility change starting program in consideration of the setting of the local copy.
Figure 15:
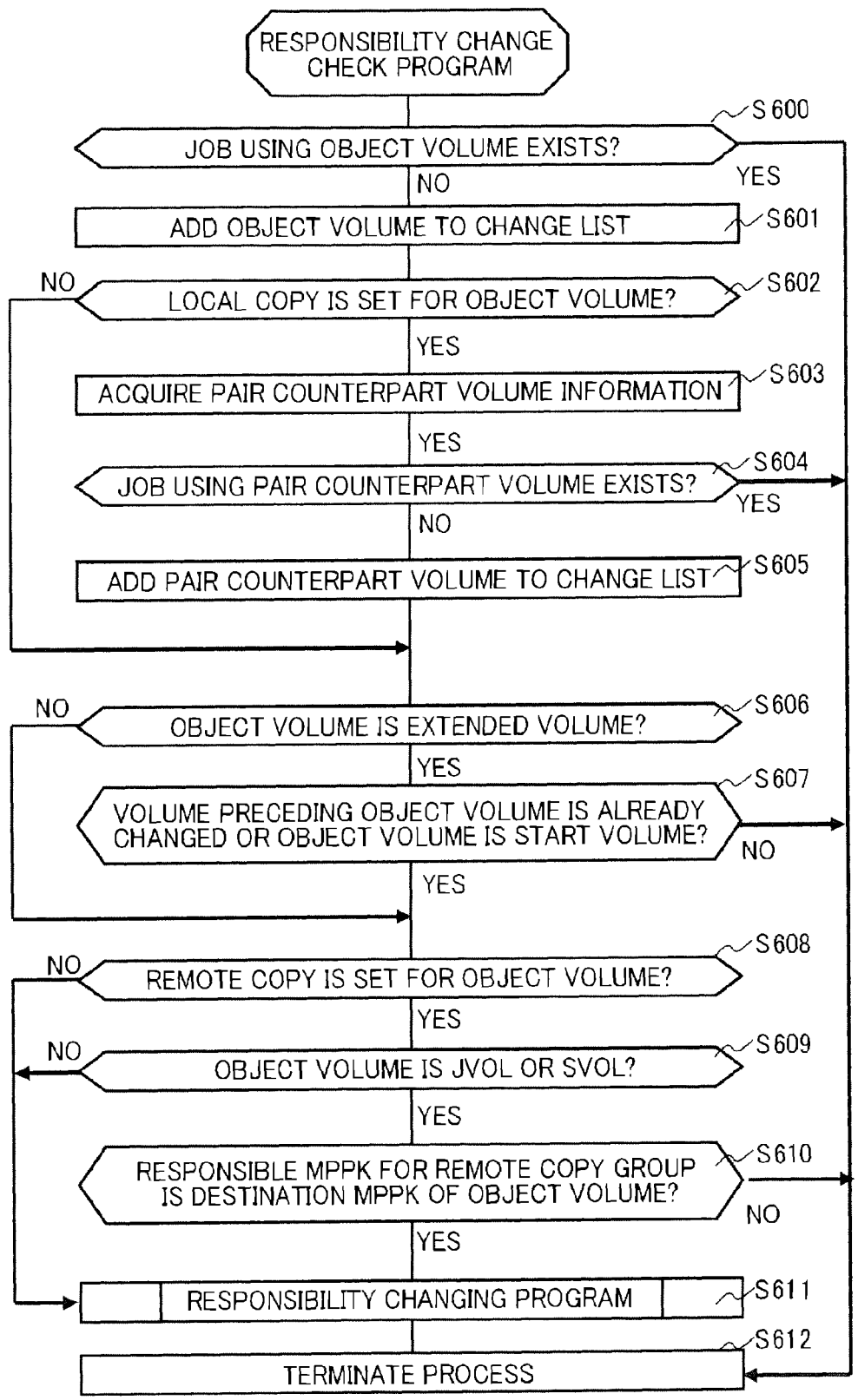
FIG. 15 is a diagram of another example of a process of the responsibility change check program.

An example of a method of changing the responsible MPPK 210 capable of avoiding the above problem will be described with reference to FIGS. 14 and 15. Specifically, in this changing method, the setting status of the local copy is checked and the responsible MPPKs 210 for the PVOL and the SVOL are changed together after a situation is achieved that the local copy process is no longer executed. FIG. 14 depicts a program modified from the responsibility change starting program 2221 shown in FIG. 8, and FIG. 15 is a program modified from the responsibility change check program 2223 shown in FIG. 10. The processes of these programs are implemented by the processor 211 of the storage system 200 executing the responsibility change starting program 2221 and the responsibility change check program 2223 stored in the program unit.

S100 and the S101 of the responsibility change starting program 2221 are the same as the responsibility change starting program 2221 shown in FIG. 8. If the PVOL is specified as the change object volume 250 of a parameters delivered from the maintenance terminal 270 to the responsibility change starting program 2221, the change of the responsible MPPK 210 for the PVOL is started at S100 and S101. Specifically, the changing bit 22123 of the responsible MPPK table 2212 is changed to ON and the MPPK number of the destination MPPK 210 delivered as the parameter is set in the destination MPPK number field 22124. The responsible MPPK number 2632 of the responsible MPPK table 263 in the FE package 260 is changed to the destination MPPK number 22124.

The responsibility change starting program 2221 then determines whether the local copy function is set for the change object volume 250 (S103). Specifically, this process is implemented by the responsibility change starting program 2221 referring to the function bit 22112 recorded in the volume table 2211 of the object volume 250.

If it is determined that the local copy function is not set for the object volume 250 (S103, No), the responsibility change starting program 2221 terminates the process (S102). In this case, this process is the same as the responsibility change starting program 2221 of FIG. 8.

On the other hand, if it is determined at S103 that the local copy function is set for the object volume 250 (S103, Yes), the responsibility change starting program 2221 acquires the volume number 22133 of the counterpart volume 250 associated by the local copy function (S104). This process is implemented by referring to the local copy table 2213.

The responsibility change starting program 2221 checks whether the change is already started for the volume 250 identified by the volume number 22133 acquired at S104 (S105) and if the change is not started (S105, No), the responsible MPPK change is started for the volume 250 (S106). At S106, the responsibility change starting program 2221 is called to start the change for the volume 250 identified at S104. Finally, the responsibility change starting program 2221 terminates the process (S102).

The responsible MPPK changing process of the PVOL and the SVOL is started as above by the responsibility change starting program 2221. In this case, the change destination of the responsible MPPKs 210 for the PVOL and the SVOL is the same MPPK 210.

In the change starting process of FIG. 14, when the responsibility change starting program 2221 is activated, the responsible MPPKs 210 for the PVOL and the SVOL is changed to the same MPPK 210 even if the responsible MPPKs 210 for the PVOL and the SVOL are different.

When the responsibility change starting program 2221 is activated, if the responsible MPPKs 210 for the PVOL and the SVOL are different, only the responsible MPPK 210 for the specified volume 250 (PVOL or SVOL) may be changed. When the responsible MPPK 210 for the PVOL is changed, whether the responsible MPPK 210 for the SVOL is also changed may be switched for each pair with the local copy function set. For the local copy pair, the responsible MPPKs 210 for the PVOL and the SVOL are changed at the same time only when the predetermined condition is satisfied. This changing process may be implemented by the storage administrator preliminarily registering the information indicative of whether the responsibilities of the PVOL and the SVOL are changed at the same time from the maintenance terminal 270 into the local copy table 2213 and by the responsibility change starting program 2221 referring to the above information.

The responsibility change check program 2223 will now be described with reference to FIG. 15. FIG. 15 depicts an example of a process flow of the responsibility change check program 2223. The responsibility change check program 2223 is called from the IO program 2222 and the monitoring program (not shown).

The responsibility change check program 2223 refers to the using job information 22113 recorded in the volume table 2211 of the object volume 250 supplied from the caller to check whether a job using the object volume 250 exists (S600). If it is determined that the using job exists (S600, Yes), the responsibility change check program 2223 terminates the process (S612) as in FIG. 10.

If it is determined that the using job does not exist (S600, No), the responsibility change check program 2223 adds the object volume 250 to a change list. The change list is a table for temporarily retaining the volume number of the change object volume 250 to determine the availability of the change for the change object volume 250 having no using job in view of other conditions, and is set in the local memory 212 of the MPPK 210 that executes the responsibility change check program 2223, for example. This is because the volume 250 potentially has the local copy function, etc., applied thereto at this time point and it cannot be determined whether the change may be performed.

The change check program 2223 then checks whether the local copy function is set for the object volume 250 (S602). If it is determined that the local copy function is not set (S602, No), it is further checked whether another storage function is applied (S606, S608). If it is determined that no storage function is applied (S606 and S608, No), the responsibility changing program 2224 is called as is the case with FIG. 10 (S611) to terminate the process (S612). The process S606 to S610 will be described later that is executed when the storage function other than the local copy is applied.

On the other hand, if it is determined that the local copy function is set (S602, Yes), the responsibility change check program 2223 refers to the local copy table 2213 to acquire the volume number 22133 of the counterpart volume 250 associated by the local copy function (S603). A reference is made to the record of the volume table 2211 for the counterpart volume 250 identified by the volume number 22133 acquired at S603 to check whether a job using the counterpart volume 250 exists (S604).

If it is determined that a job using the counterpart volume 250 exists (S604, Yes), the responsibility change check program 2223 terminates the process (S604). If it is determined that a job using the counterpart volume 250 does not exist (S604, No), the responsibility change check program 2223 calls the responsibility changing program 2224 (S611) to terminate the process (S612). Only when no job is using the PVOL and the SVOL with the local copy set, the responsibility changing program 2224 is called to change the responsible MPPK 210. A process flow of the responsibility changing program 2224 called from S611 is the same as the process flow shown in FIG. 11.

After confirming that no job is using the PVOL and the SVOL at S600 and S604, the copy program 2230 may be operated and the PVOL and the SVOL may start being used in some cases. To prevent the copy program 2230 from being activated in this state, the copy program 2230 is configured to be reactivated in the destination MPPK 210 if the PVOL is in process of changing when the copy program is activated. Specifically, a reference is made to the responsible MPPK table 2212 between S500 and S501 of the copy program 2230 of FIG. 13 and, if the changing bit 22123 for the volume number 22121 corresponding to the PVOL is ON, the process goes to S507 to reactivate the copy program 2230 in the MPPK 210 identified by the destination MPPK number 22124 (not shown).

As above, the performance deterioration of the local copy process and the situation making the operation of the local copy process itself unavailable may be avoided by changing the responsible MPPKs 210 for the PVOL and the SVOL in consideration of the setting status of the local copy function.

Extended Volume Function

An extended volume function will now be described, which is one of the storage functions. As is the case with the local copy function, a schematic of the extended volume function will be described, and a problem in the architecture of determining the responsible MPPK 210 in advance and a changing method of the responsible MPPK 210 capable of eliminating the problem will be described.

The extended volume function is a function of collectively providing a plurality of the volumes 250 as one large-capacity volume 250 to the host 100. The volume 250 made up of a plurality of the volumes 250 is hereinafter referred to as an extended volume, and the volumes 250 making up the extended volume are referred to as constituent volumes. By using a plurality of the volumes 250, the disk devices 240 more than the normal volume 250 may be used as a storage area and the large-capacity volume 250 may be provided. The host 100 recognizes a plurality of the volumes 250 as the one integrated large-capacity volume 250 instead of individually recognizing the volumes 250.

FIG. 16 depicts an example of the extended volume table 2214 for managing the extended volumes. The extended volume table 2214 includes an extended volume number field 22141 and a constituent volume number field 22142. The extended volume number field 22141 records the extended volume number that is the identification code for identifying each of the extended volumes set in the storage system 200. The constituent volume number field 22142 records the constituent volume number that is the identification code for identifying the constituent volumes 250 making up one extended volume. In this example, the extended volume number 22141 is defined as the constituent volume number 22142 given to any one volume 250 of the constituent volumes 250 making up one extended volume. Therefore, the IO request from the host 100 is allocated by the FE package 260 to the responsible MPPK 210 for the volume 250 having the constituent volume number 22142 same as the extended volume number 22141.

In an example recorded in a first line of FIG. 16, one extended volume is made up of three constituent volumes 250 (hereinafter, "constituent volume 1 to constituent volume 3") identified by the constituent volume numbers of 1, 2, and 3, and the extended volume number of the extended volume is 1. Therefore, the IO request from the host 100 is allocated by the FE package 260 to the responsible MPPK 210 for the constituent volume 1. Even if the object area of the IO request from the host 100 is included in the constituent volume 2, the IO request is allocated to the responsible MPPK 210 for the constituent volume 1 in the same way. If the responsible MPPK 210 for the constituent volume 2 is different from the responsible MPPK 210 for the constituent volume 1, the responsible MPPK 210 for the constituent volume 1 is unable to process the IO request to the constituent volume 2.

Figure 17:
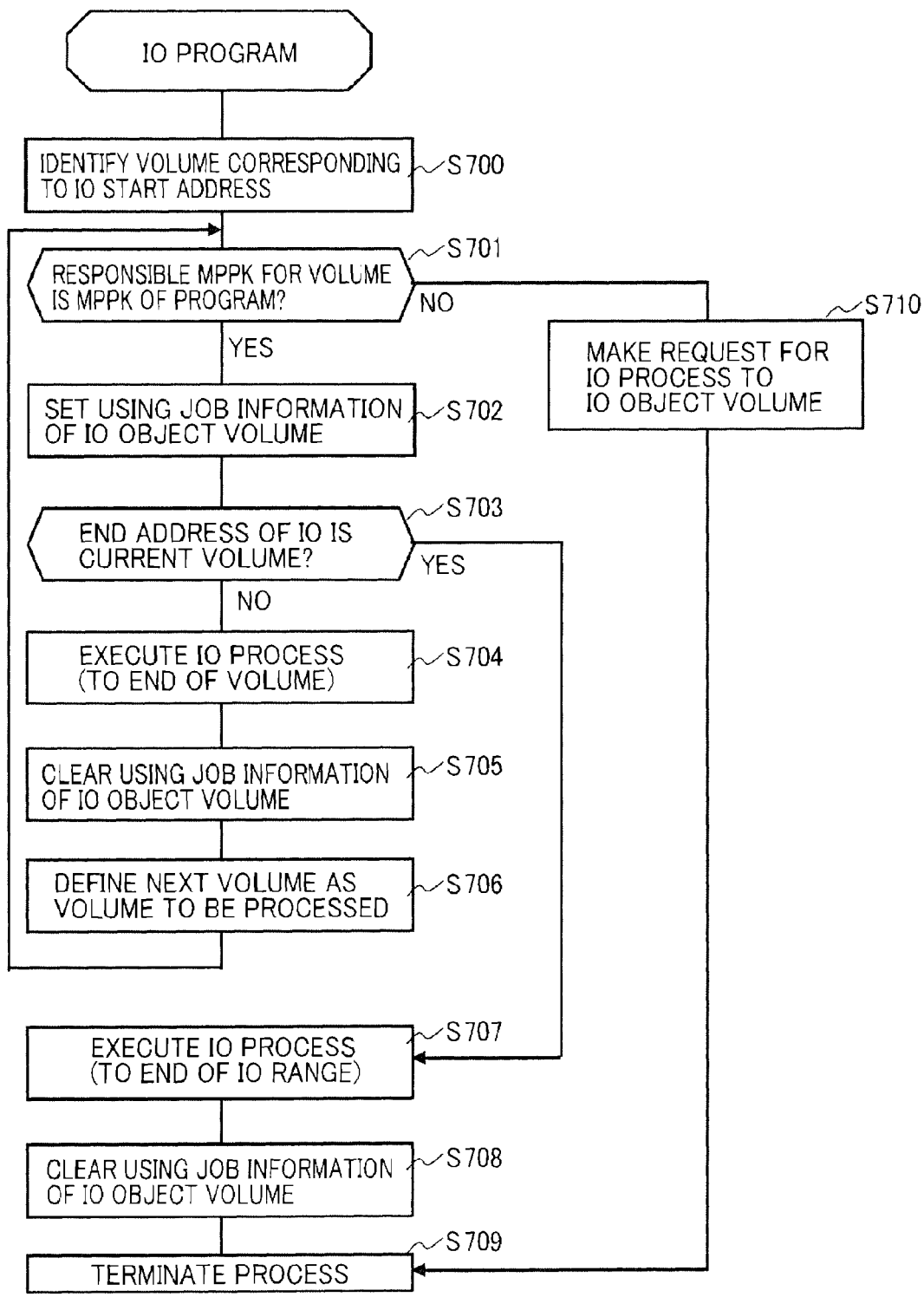
FIG. 17 is a diagram of an example of a process of an IO program processing IO for an extended volume.

A process of the IO request issued to the extended volume will now be described with reference to FIG. 17. FIG. 17 depicts an example of the process of the IO program 2222 executed when the IO request is issued to the extended volume.

The IO program 2222 refers to the storage area addresses of the volumes 250 retained in the control information unit 221 to identify the constituent volume 250 including the start address of the IO object area (S700). The IO program 2222 determines whether the responsible MPPK 210 for the constituent volume 250 identified at S700 is the MPPK 210 of the IO program (S701).

If it is determined that the responsible MPPK 210 is the MPPK 210 of the IO program (S701, Yes), the IO program 2222 refers to the volume table 2211 to register the job number possessed by the IO request for the constituent volume 250 into the using job information field 22113 (S702). The IO program 2222 then executes the IO within an executable range for the relevant constituent volume 250. Specifically, the IO program 2222 determines whether the end address of the IO is included in the storage area address of the constituent volume 250 (S703). If included (S703, Yes), the IO program 2222 executes the IO for the constituent volume 250 to the end of the IO range specified by the host 100 (S707) and deletes the job number from the using job information field 22113 of the volume table 2211 (S708). The IO program 2222 then terminates the process (S709).

On the other hand, if it is determined at S703 that the end address of the IO is not included in the constituent volume 250 (S703, No), i.e., if the IO range of the IO request includes the storage area address of the next constituent volume 250, the IO program 2222 executes the IO to the end of the currently processed constituent volume 250 (S704) and deletes the job number from the using job information field 22113 of the volume table 2211 (S705). The IO program 2222 defines the constituent volume 250 next to the currently processed constituent volume 250 as a volume to be processed and returns to S701 (S706). The IO may completely be executed by repeatedly executing S701 to S706.

If it is determined at S701 that the responsible MPPK 210 for the constituent volume is another MPPK 210 (S701, No), the IO program 2222 requests the responsible MPPK 210 for the constituent volume 250 to execute the IO process (S710). The responsible MPPK 210 receiving this request executes S700 to S710 of the IO program 2222 to process the IO.

As can be seen from the description of FIG. 17, if the responsible MPPKs 210 for the constituent volumes 250 are different, the MPPKs 210 must communicate in synchronization with IO.

In the case of the extended volume, several tens of the volumes 250 are associated. On the other hand, more than several thousand volumes 250 may be created in the storage system 200. Therefore, it is desirable to match the responsible MPPKs 210 for the constituent volumes 250 as far as possible to avoid the communication between the MPPKs 210 in the case of the extended volume function as is the case with the local copy function. S701 and S710 of the IO program 2222 may be omitted to simplify the program structure by always matching the responsible MPPKs 210 for the constituent volumes 250.

Description will be made of a problem that may occur if the responsible MPPK 210 for the volume 250 with the extended volume function set is changed. If the responsible MPPK 210 for the constituent volumes 250 making up the extended volume is changed without considering the setting status of the extended volume function, the following problem may occur.

As is the case with the local copy function, if the responsible MPPK 210 is changed only for some of the constituent volumes 250, S710 must be executed in association with the communication between the MPPKs 210 and the IO performance deteriorates. For the extended volume made up of the volume 1 and the volume 2, the IO request across the storage area addresses of the constituent volume 1 and the constituent volume 2 may be received. In this case, the process may be executed in the following order, inevitably causing the execution of S710 or making the execution of the IO impossible.

Before starting changing the responsible MPPK 210 for the extended volume, the source MPPK 210 receives the IO request across the constituent volume 1 and the constituent volume 2, and while the IO for the constituent volume 1 is being executed, the change of the responsible MPPK 210 for the extended volume is started. Since the IO does not use the constituent volume 2 at this time point, the monitoring program not shown changes the responsible MPPK 210 for the constituent volume 2. In this case, the IO program 2222 must execute S710 to request the IO process to the responsible MPPK 210 for the constituent volume 2, and the IO performance deteriorates. If the IO program 2222 is not provided with S701 and S710, the IO request for the extended volume becomes impossible in the middle of execution. To avoid this situation, the responsible MPPKs 210 for the constituent volumes 250 must be changed in order from the constituent volume 250 corresponding to the beginning portion of the extended volume toward the end of the extended volume in the extended volume function.

Figure 18:
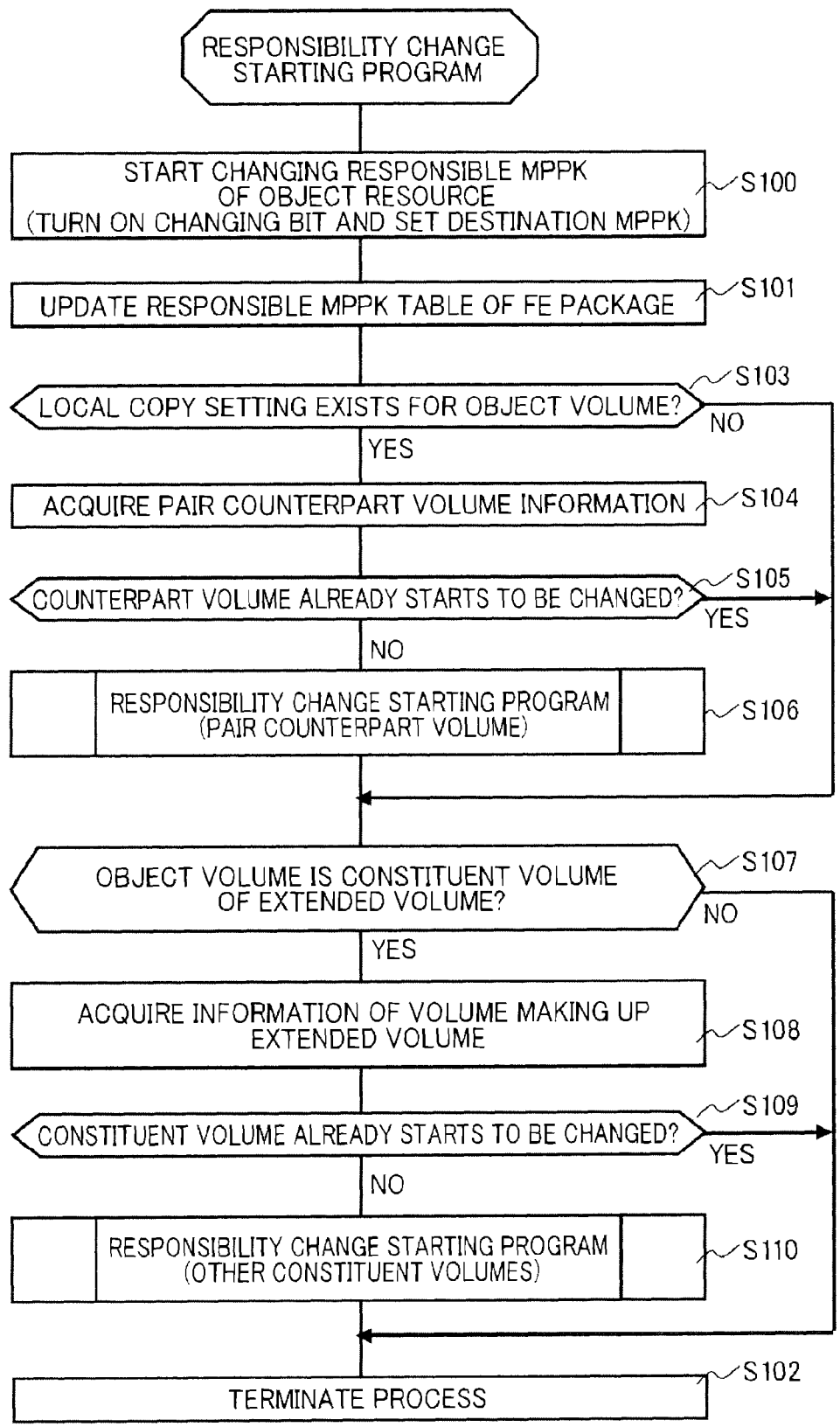
FIG. 18 is a diagram of an example of a process of the responsibility change starting program in consideration of the setting of the extended volume.

An example of a changing method of the responsible MPPKs 210 avoiding the above problem will be described with reference to FIGS. 18 and 15. FIG. 18 depicts a program partially modified from the responsibility change starting program 2221 shown in FIG. 14. The process of this responsibility change starting program 2221 is implemented by the processor 211 of the storage system 200 executing the responsibility change starting program 2221 and the responsibility change check program 2223 stored in the program unit 222.

The responsibility change starting program 2221 of FIG. 18 is formed by adding S107 to S110 to the responsibility change starting program 2221 of FIG. 14. If the extended volume function is set for the change object volume 250, the process from S108 is executed.

The responsibility change starting program 2221 determines whether the change object volume 250 is the constituent volume 250 of the extended volume (S107). If it is determined that the change object volume 250 is not the constituent volume 250 (S107, No), the responsibility change starting program 2221 terminates the process (S102). On the other hand, if it is determined that the change object volume 250 is the constituent volume 250 (S107, Yes), the responsibility change starting program 2221 acquires information of all the constituent volumes 250 making up the extended volume including the change object volume 250 (S108). This is implemented by the responsibility change starting program 2221 referring to the extended volume table 2214.

The responsibility change starting program 2221 then checks whether the responsible MPPKs 210 for all the constituent volumes 250 start to be changed (S109). This process is implemented by the responsibility change starting program 2221 referring to the changing bit 22123 of the responsible MPPK table 2212. If one or more of the constituent volumes 250 are not being changed (S109, No), the responsibility change starting program 2221 goes to S110. The responsibility change starting program 2221 calls the responsibility change starting program 2221 for all the constituent volumes 250 not being changed to start the change (S110). Finally, the responsibility change starting program 2221 terminates the process (S102).

A method of checking the availability of the change of the constituent volumes 250 making up the extended volume will be described with reference to a process flow of the responsibility change check program 2223 of FIG. 15. If the change object volume 250 is the constituent volume 250 making up the extended volume, the responsibility change check program 2223 executes the process from S607.

The responsibility change check program 2223 checks whether the change object volume 250 is the constituent volume 250 of the extended volume (S606). If it is determined that the change object volume 250 is not the constituent volume (S606, No), it is checked whether another storage function is applied (S608). If it is determined that no storage function is applied (S608, No), the responsibility changing program 2224 is called as is the case with FIG. 10 (S611) to terminate the process (S612).

On the other hand, if it is determined that the change object volume 250 is the constituent volume 250 of the extended volume (S606, Yes), the responsibility change check program 2223 determines whether the change object volume 250 is the constituent volume 250 corresponding to the beginning portion of the extended volume or whether the responsible MPPK 210 for another constituent volume 250 located before the change object volume 250 is already changed (S607). When it is determined that either condition is satisfied (S607, Yes), if no another storage function is set, the responsibility change check program 2223 calls the responsibility changing program 2224 (S611) to terminate the process.

On the other hand, if it is determined at S607 that neither of the conditions is satisfied (S607, No), the responsibility change check program 2223 terminates the process (S612). Specifically, when the extended volume is made up of constituent volumes 1, 2, and 3 and the change object volume 250 is the constituent volume 3, if the change of the responsible MPPKs 210 is competed for other constituent volumes 1 and 2 and no job is using the constituent volume 3, the responsibility changing program 2224 changes the responsible MPPK 210 for the constituent volume 3. If the change object volume 250 is the constituent volume 1, the responsibility changing program 2224 changes the responsible MPPK 210 for the constituent volume 3 when no job is using the constituent volume 1. A process flow of the responsibility changing program 2224 called from S611 is the same as FIG. 11.

As above, the IO performance deterioration in the extended volume function and the situation making the execution of the IO unavailable may be avoided by changing the responsible MPPKs 210 for the constituent volumes 250 in consideration of the setting status of the extended volume function.

Remote Copy Function

A remote copy function will now be described, which is one of the storage functions. As is the case with the local copy function, a schematic of the remote copy function will be described, and a problem in the architecture of determining the responsible MPPK 210 in advance and a changing method of the responsible MPPK 210 capable of eliminating the problem will be described.

The remote copy function is a function of creating a copy of data stored in the volume 250 of the certain storage system 200 into the storage system 200 in another chassis. As is the case with the local copy function, the copy source volume 250 and the copy destination volume 250 are referred to as PVOL and SVOL, respectively. Even if the storage system 200 on the PVOL side is damaged due to disaster or system failure, business operations may be continued with the use of data stored in SVOL by preliminarily copying the data of PVOL into SVOL in the different storage system 200 with the use of the remote copy function.

Figure 19:
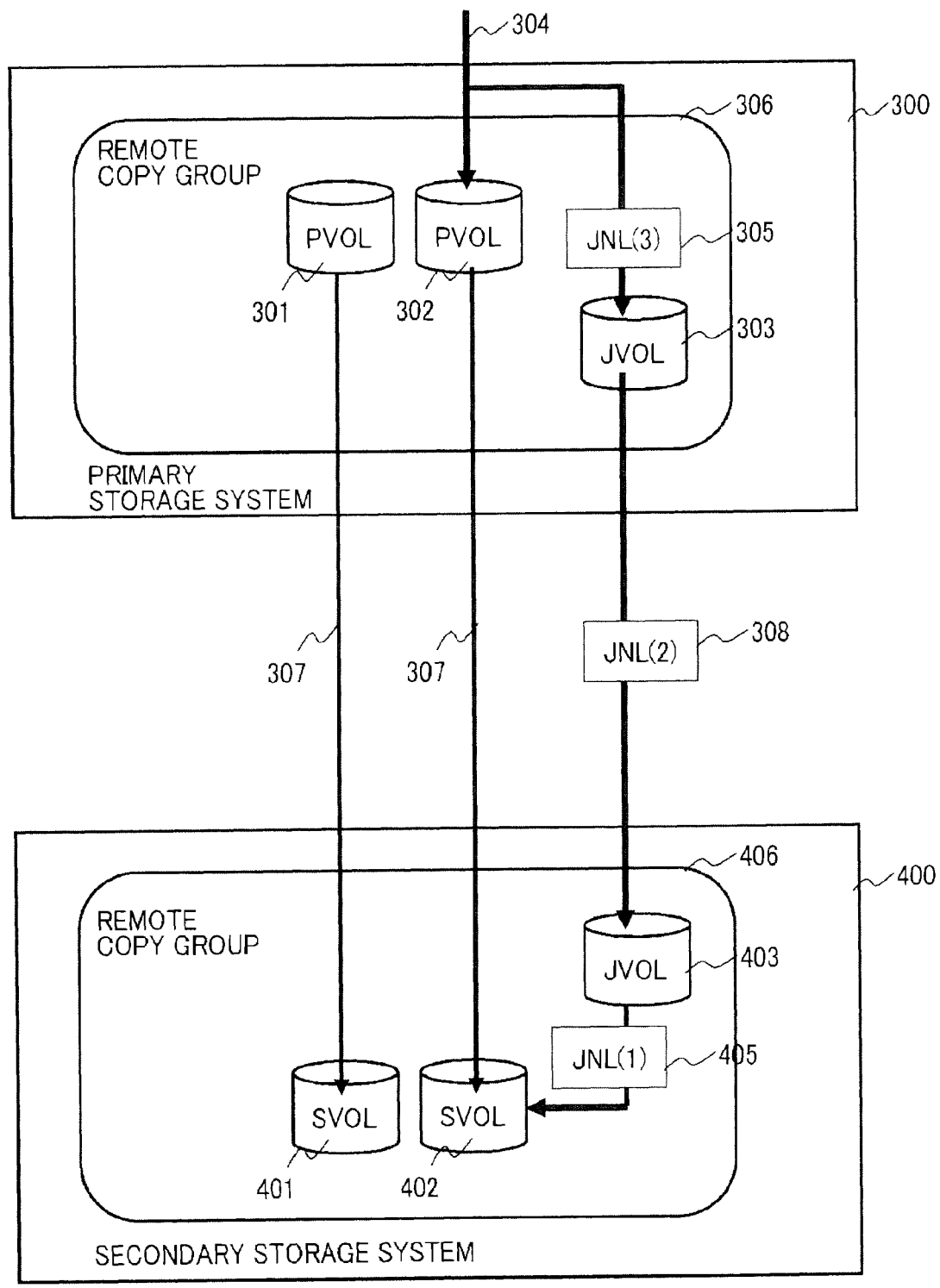
FIG. 19 is a diagram of an example of a configuration of a remote copy function.

FIG. 19 depicts an example of a configuration implementing the remote copy function. A primary storage system 300 is the storage system 200 having PVOL and a secondary storage system 400 is the storage system 200 having SVOL.

The configuration of the primary storage system 300 will first be described. PVOL 301 and PVOL 302 are the source volumes 250 of the remote copy. A journal volume 303 (hereinafter, "JVOL") is the volume 250 for temporarily storing data to be transferred to the secondary storage system 400.

The configuration of the secondary storage system 400 will now be described. The secondary storage system 400 has the same configuration as the primary storage system 300. SVOL 401 and SVOL 402 are the destination volumes 250 of the remote copy. JVOL 403 is the volume 250 for temporarily storing data transferred from the primary storage system 300 to the secondary storage system 400.

Arrows 307 indicate pair relations of the remote copy. In the example of FIG. 19, the PVOL 301 and the SVOL 401 make a pair. The copy of the PVOL 301 is the SVOL 401. The PVOL 302 and the SVOL 402 make a pair.

The data transferred from the primary storage system 300 to the secondary storage system 400 may temporarily be stored in the cache unit 223 instead of the JVOL 303 and JVOL 403.

A schematic of the copy operation of the remote copy will now be described. When receiving a write request for the PVOL of the remote copy from the host 100, the copy program creates transfer data called journal consisting of write data and control information for the write data and stores the journal into the JVOL 303. After the completion of acceptance of the write request from the host 100, the journal is copied from the JVOL 303 to the JVOL 403 of the secondary storage system 400. Finally, the journal is read from the JVOL 403 and the write data in the journal is written into the SVOL in the secondary storage system 400. The copy program copies the data of the PVOL into the SVOL as above.

An arrow 304 represents a write request to the PVOL 302. A journal 305 represents a state of the journal before being stored in the JVOL 303. The journal 308 represents a state of the journal being transferred from the primary storage system 300 to the secondary storage system 400. The journal 405 represents a state of the journal before being copied from the JVOL 403 to the SVOL 402 in the secondary storage system 400.

Lastly, a remote copy group 306 will be described. A remote copy group 406 is the same as the remote copy group 306.

The remote copy group 306 includes a plurality of the PVOLs 301 and 302, and a plurality of the JVOLs 303. The remote copy group 306 is characterized in that the write data is written into the SVOL in the write order issued by the host 100 for the PVOLs 301 and 302 in the same remote copy group 306. Specific description will be made with reference to the example of FIG. 19.

It is assumed that a write request 1 is issued from the host 100 to the PVOL 301 and that a write request 2 is subsequently issued to the PVOL 302. In this case, the secondary storage system 400 is controlled such that the write request 2 is written into the SVOL 402 after the write request 1 is written into the SVOL 401.

The write order is assured in the primary and secondary remote copy groups as above because if the write order is changed, operations may not be restored with the use of SVOL in such a case that data written into a certain PVOL earlier is not reflected on a destination SVOL.

The remote copy function stores a write order number (described later) in the journal and transfers the write order number to the secondary storage system 400 to assure the write order. The secondary storage system 400 writes the write data into the SVOL in the order of the write order number stored in the journal.

FIG. 20 depicts an example of the remote copy table 2215 that stores management information of the remote copy groups 306, 406. The remote copy table 2215 includes a remote copy group number field 22151, an attribute field 22152, a JVOL number field 22153, a PVOL number field 22154, an SVOL number field 22155, and a write order number field 22156.

The remote copy group number field 22151 records the remote copy group number that is the number for identifying each of the remote copy groups 306, 406. The attribute field 22152 records the attribute that is information indicative of whether each of the remote copy groups 306 and 406 identified by the remote copy group number is a source remote copy group or a destination remote copy group. The JVOL number field 22153 records the JVOL number that is the volume number for identifying the JVOL provided in the remote copy groups 306 and 406. The PVOL number field 22154 records the volume number of the PVOL included in the remote copy group 306. The SVOL number field 22155 records the volume number of the SVOL included in the remote copy group 406. The write order number field 22156 records the write order number that is the number given to journals in the order of data written into the PVOL. The write order number 22156 is automatically issued on the basis of a remote copy group each time the data is written into the PVOL.

In the example of FIG. 20, the remote copy group 306 having the remote copy group number of 1 is a source remote copy group including PVOL. This remote copy group 306 has JVOLs 11, 12 and PVOLs 1, 2, and 3. The copy destination SVOLs for data of the PVOLs 1, 2, and 3 are SVOLs 20, 12, and 13, respectively. Lastly, the current value of the write order number is 100. That is, the next journal generated is allocated with the write order number of 100. After the allocation, the write order number 22156 is updated to 101.

If the remote copy table 2215 is stored in the local memory 212 in the MPPK 210 along with the control information necessary for the process of the volume 250, the performance of the write request to the PVOL can be improved.

However, the write order number 22156 of the remote copy table 2215 is referenced and updated every time a write request is generated. Therefore, to store the remote copy table 2215 in the local memory 212, the MPPK 210 accessing the write order number 22156 of the remote copy table 2215 must be limited to one MPPK 210 and the remote copy table 2215 must be stored only in this MPPK 210.

To implement this configuration, the remote copy function preliminarily determines the MPPK 210 responsible for the process of remote copy for each remote copy group and this MPPK 210 stores the remote copy table 2215 in the local memory 212 of the MPPK 210.

A journal creation process and a journal restore process will hereinafter be described as an example of the process referring to and updating the remote copy table 2215 every time one journal is processed.

An example of a journal creation process flow will be described with reference to FIG. 21. The journal creation process is performed by the processor 211 of the storage system 200 executing a write data reception program and a journal creation program (not shown) stored in the program unit 222 of the memory package 220.

When the write data reception program of the storage system 200 receives a write request from the host 100 (S1400), the write data is written into the write object volume 250 (S1401). The write data reception program then activates the journal creation program (S1402).

The journal creation program acquires the write order number field 22156 from the remote copy table 2215 (S1403). The journal creation program adds one to the acquired write order number to update the write order number in preparation for the write order number used in the subsequent journal creation (S1404).

The journal creation program creates a journal from the control information related to the journal, such as the acquired write order number 22156, the PVOL number 22154, the SVOL number 22155, and the remote copy group number 22151, and the write data to store the journal into the JVOL (S1405).

Since the usage rate of the JVOL varies due to the storage of the journal, the journal creation program updates the usage rate of the JVOL (S1406). Lastly, the journal creation program makes a report of completion to the write data reception program that is the caller (S1407). The write data reception program 231 receives the report of completion and terminates the process (S1408).

Figure 22:
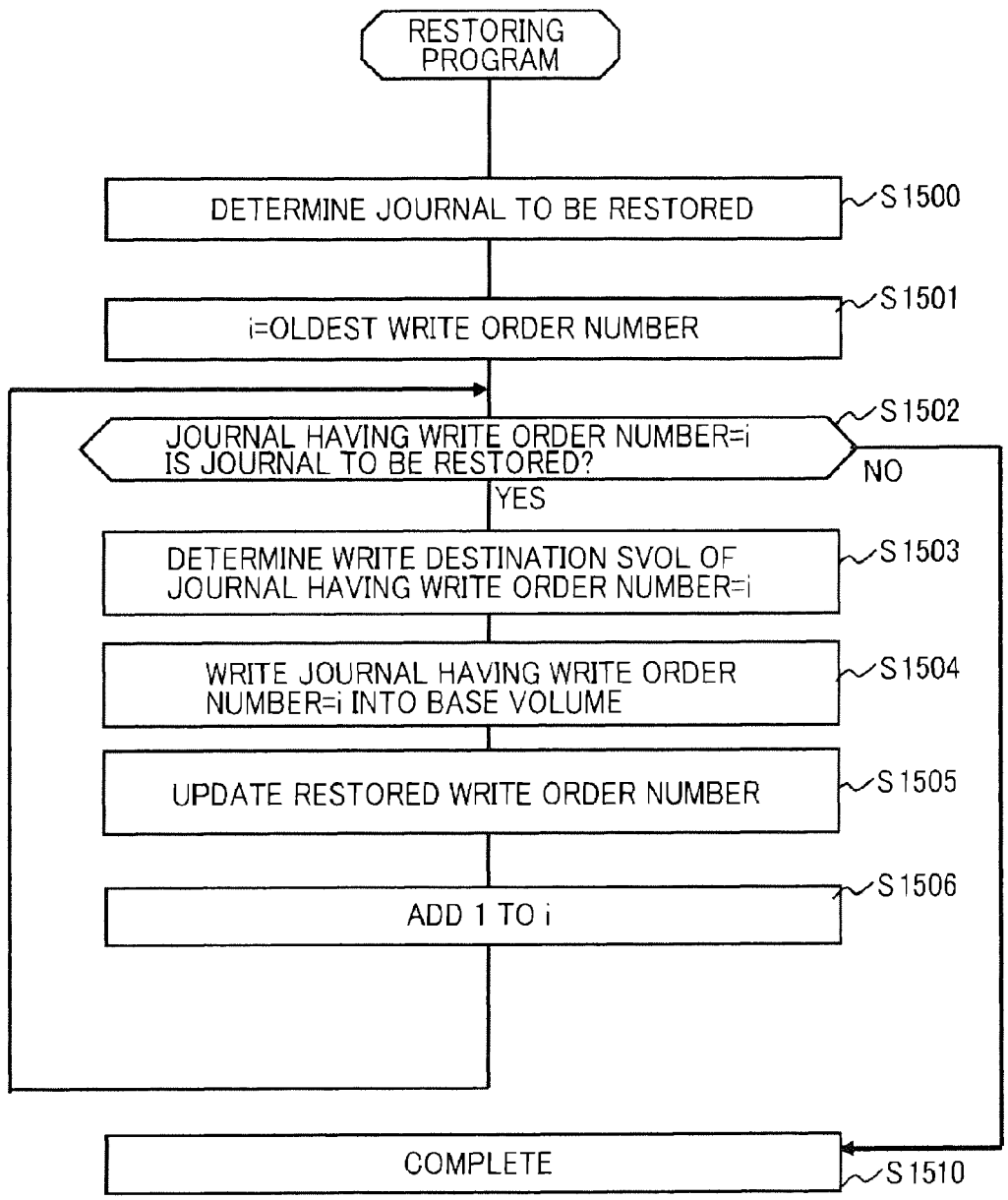
FIG. 22 is a diagram of an example of a restore process flow executed in the remote copy function.

An example of the process of writing from JVOL into SVOL the journal transferred from the PVOL side will be described with reference to FIG. 22. The process of writing the journal from JVOL into SVOL is referred to as a restore process. The restore process is performed by the processor 211 of the storage system 200 executing a restoring program (not shown) stored in the program unit 222 of the memory package 220.

The restoring program determines a journal to be restored (S1500). The journal to be restored is determined from the journals stored in the JVOL such that the write order number is increased in series from the oldest journal. For example, if journals having the write order number of 1 to 1000 exist, the journals having the write order number of 1 to 100 can be restored. However, the journals having the write order number of 50 to 100 cannot be restored. The journals having the write order number of 1 to 30 and 50 to 70 cannot be restored either. This is because the state of SVOL is always kept in a state possibly happened in PVOL in the past by writing into SVOL the data written from the host 100 into PVOL in accordance with the write order number 22156. This enables the operation process utilizing SVOL to be resumed if a failure occurs in PVOL.

The restoring program then substitutes the minimum value of the write order number 22156 of the journals determined to be restored for a variable i (S1501). The variable i is temporarily stored in the local memory 212 of the MPPK 210. The restoring program refers to the journals in order of the write order number to check whether the journals are to be restored (S1502). If it is determined that the journals are not to be restored (S1502, No), the restore process is terminated (S1510).

If it is determined that the journals are to be restored at S1502 (S1502, Yes), the restoring program executes a process of restoring the journals determined to be restored (S1503 to S1506).

Firstly, the restoring program determines an application SVOL of the referenced journal (S1503). The journal created for the write to a certain PVOL must be restored in the SVOL in a pair relationship with the PVOL in the remote copy function. The restoring program determines the application SVOL of the journal with the use of the SVOL number 22155 stored in the journal when the journal is created.

Once the application SVOL of the journal is determined, the restoring program writes the journal into the SVOL (S1504) and replaces the restored write order number 22156 with the write order number 22156 of the applied journal (S1505). Lastly, the restoring program adds one to the variable i (S1506) and returns to S1502 to process the next journal.

With the above configuration, the write data to the PVOL with the remote copy function set is copied to the SVOL while maintaining the order of the writing into the PVOL. The remote copy group configured in this way is generally referred to as a consistency group.

FIG. 23 depicts an example of a responsible MPPK table for remote copy group 2216 (hereinafter, for simplicity, "responsible MPPK table 2216") that manages the MPPK 210 responsible for the processes of the remote copy group. The responsible MPPK table 2216 consists of a remote copy group number field 22161 and a responsible MPPK number field 22162.

The remote copy group number field 22161 records the remote copy group number 22161 that is the identification number for identifying the remote copy groups 306, 406. The responsible MPPK number field 22162 records the responsible MPPK number 22162 same as the case of the responsible MPPK table 2212 shown in FIG. 6.

Description will now be made of how the responsible MPPK is optimally set for the PVOL, the JVOL, the SVOL, and the remote copy groups of the remote copy function as is the case with the local copy function and the extended volume function.

The process of remote copy in the primary storage system 300 will first be described. When receiving a write request from the host 100 to PVOL, the remote copy function writes data related to the write request into the PVOL, and creates and stores a journal into JVOL. If the responsible MPPK 210 for the PVOL and the responsible MPPK 210 for the remote copy group are different, the responsible MPPK 210 for the PVOL must make a request for the journal creation process to the responsible MPPK 210 for the remote copy group. On this occasion, the responsible MPPK 210 for the PVOL and the responsible MPPK 210 for the remote copy group must communicate.

The journal created by the responsible MPPK 210 for the remote copy group is then stored in the JVOL. If the responsible MPPK 210 for the remote copy group and the responsible MPPK 210 for the JVOL are different, the responsible MPPK 210 for the remote copy group must make a request for the journal storage process to the responsible MPPK 210 for the JVOL. On this occasion, the responsible MPPK 210 for the remote copy group and the responsible MPPK 210 for the JVOL must communicate.

Finally, the journal stored in the JVOL is transferred to the secondary storage system 400. Specifically, with the copy program implementing the remote copy function, the responsible MPPK 210 for the remote copy group determines the journal to be transferred and acquires the storage address of the JVOL storing the determined journal to transfer the journal. Therefore, if the responsible MPPK 210 for the remote copy group and the responsible MPPK 210 for the JVOL are different, the responsible MPPK 210 for the remote copy group must request the responsible MPPK 210 for the JVOL to transfer the journal to the secondary storage system 400 after identifying the journal to be transferred and determining the storage address. On this occasion, the responsible MPPK 210 for the remote copy group and the responsible MPPK 210 for the JVOL must communicate.

As above, in the primary storage system 300, a round-trip communication must be performed up to twice between the MPPKs 210 for creating the journal and the round-trip communication must be performed once between the MPPKs 210 for transferring the created journal.

How the responsible MPPK is optimally determined for the PVOL and the JVOL in the remote copy function will now be described. As above, the JVOL is the volume 250 for temporarily storing the transfer data from the PVOL to the SVOL. As a result, one remote group approximately has several to dozen JVOLs. Therefore, it is desirable to match the responsible MPPKs 210 for the remote copy group and the JVOL as far as possible to avoid the communication between the MPPKs 210.

On the other hand, one remote copy group has several hundred to several thousand PVOLs. If the responsible MPPKs 210 for the PVOL and the remote copy group are the same, the one MPPK 210 must process not only the journal creation process associated with the write request but also the read process for the PVOL. To prevent the process costs from concentrating on one MPPK 210, it is desirable to not match the responsible MPPKs 210 for the PVOL and the remote copy group.

The process of remote copy in the secondary storage system 400 will now be described. The secondary storage system 400 writes the write data in the journal transferred from the primary storage system 300 and stored in the JVOL into the SVOL.

The copy program of the secondary storage system 400 searches a journal having the smallest write order number 22156 among the journals stored in the JVOL. It is then determined whether the write order number 22156 of the journal is the next to the write order number 22156 of the previous journal written into the SVOL. If the write order number 22156 of the searched and acquired journal is the next to the write order number 22156 of the previous journal written into the SVOL, the remote copy program activates the local copy program and gives an instruction for copying from the JVOL to the SVOL.

If the responsible MPPK 210 for the remote copy group and the responsible MPPK 210 for the JVOL are different, the copy program must be activated by the responsible MPPK 210 for the JVOL. On this occasion, the responsible MPPK 210 for the remote copy group and the responsible MPPK 210 for the JVOL must communicate.

If the responsible MPPK 210 for the JVOL and the responsible MPPK 210 for the SVOL are different, a request must be made for the local copy process on the SVOL side to the responsible MPPK 210 for the SVOL. On this occasion, the responsible MPPK 210 for the JVOL and the responsible MPPK 210 for the SVOL must communicate.

As above, a round-trip communication must be performed up to twice between the MPPKs 210 for writing the journal into the SVOL in the secondary storage system 400.

How the responsible MPPK is optimally determined for the SVOL and the JVOL in the remote copy function will now be described. It is desirable that the responsible MPPK 210 for the remote copy group takes responsibility for the process of the JVOL for the same reason as the primary storage system 300.

On the other hand, one remote copy group has several hundred to several thousand SVOLs as is the case of the PVOLs. However, since the SVOL is the volume 250 used for business operation recovery at the time of disaster etc., the write and read requests from the host 100 are not generated as in the case of the PVOL. Therefore, it is not necessary to consider the cost distribution of the read request as in the case of the PVOL. Therefore, it is desirable to match the responsible MPPKs 210 for the remote copy group and the SVOL as far as possible to avoid the communication between the MPPKs 210.

Description will now be made of a problem that occurs due to changing the responsible MPPK 210 for the remote copy group and the responsible MPPK 210 for the volume 250 with the remote copy function set. If the responsible MPPK 210 for the remote copy group and the responsible MPPK 210 for the volume 250 with the remote copy function set are changed without considering the setting status of the remote copy function, the following problem may occur.

Figure 21:
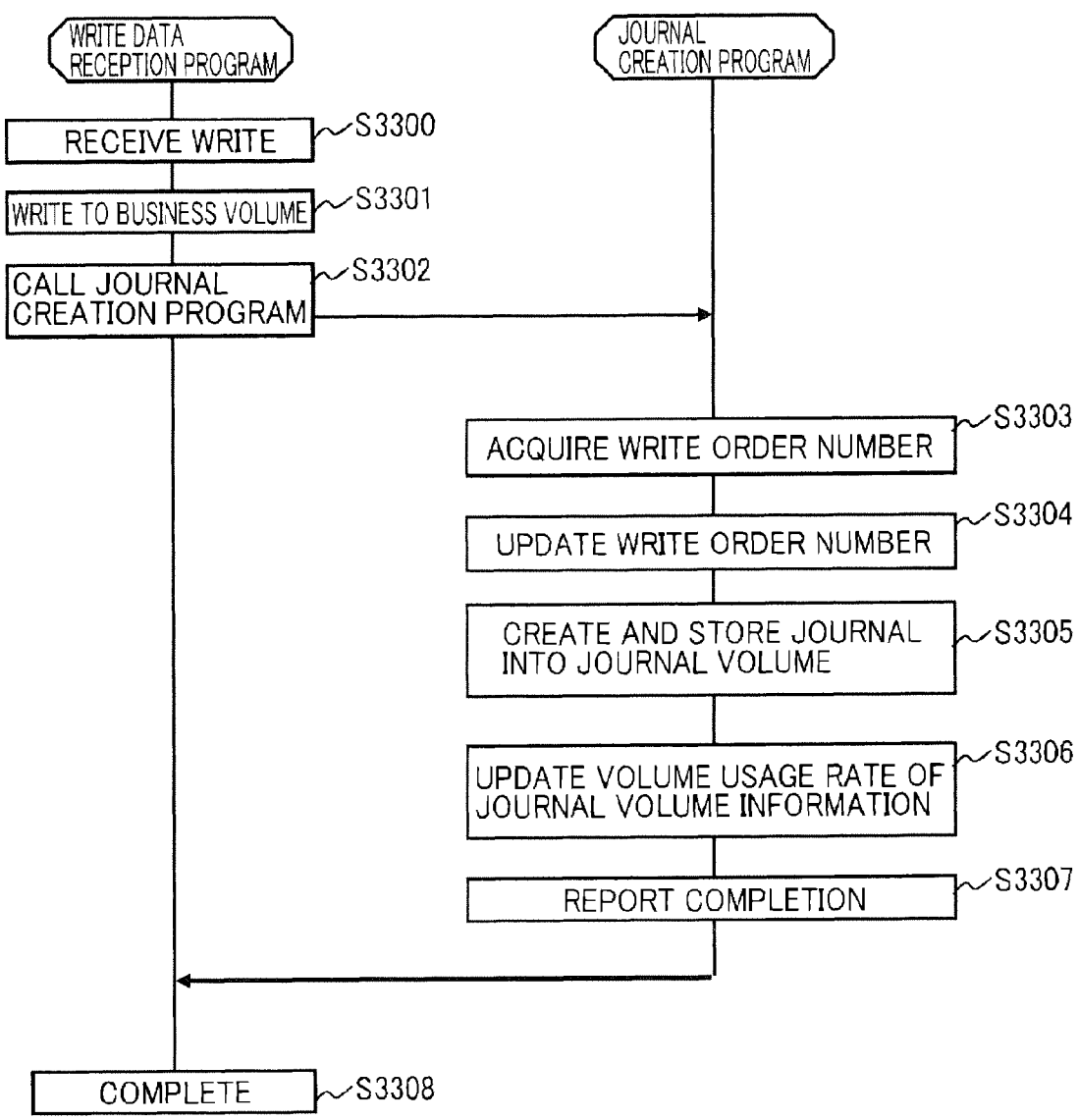
FIG. 21 is a diagram of an example of a journal creation process flow executed in the remote copy function.

When the responsible MPPK 210 for the PVOL is different from the responsible MPPK 210 for the remote copy group, the JNL creation process is implemented by the responsible MPPK 210 for the PVOL executing steps S1400 to S1402 and S1408 of FIG. 21 and by the responsible MPPK 210 for the remote copy group executing steps S1403 to S1407. In this case, at step S1402, the inter-MPPK communication is performed and the responsible MPPK 210 for the remote copy group activates the journal creation program.

A problem in the primary storage system 300 will first be described. If the responsible MPPK 210 for the remote copy group is changed, the communication between the MPPKs 210 becomes necessary for storing the journal and the IO performance deteriorates unless the responsible MPPK 210 for the JVOL is changed, as described above. Even when both the responsible MPPK 210 for the remote copy group and the responsible MPPK 210 for the JVOL are changed, the communication between the MPPKs 210 becomes necessary for storing the journal and the IO performance deteriorates if the responsible MPPK 210 for the JVOL is changed before changing the responsible MPPK 210 for the remote copy group. Unless the communication function between the MPPKs 210 for storing the journal into the JVOL is implemented on the basis that the responsible MPPKs 210 for the remote copy group and the JVOL are always matched, the IO process of the remote copy function becomes impossible in the middle of execution.

The above problem will hereinafter specifically be described. The following description is based on the case that the responsible MPPK 210 for the remote copy group and the JVOL is changed from MPPK 1 to MPPK 2. The responsible MPPK 210 for the JVOL has a possibility to be changed if the job number is not set in the using job information field 22113 of the JVOL. Although there is a possibility that the MPPK 1 creates the journal and has a process immediately before storing the created journal in this case, the responsible MPPK 210 for the JVOL has been changed from the MPPK 1 to the MPPK 2 and the process in the MPPK 1 is not continuable. On the other hand, the journal creation process to be requested to destination MPPK2 can be waited for changing because it can be known that the responsible MPPK 210 for the JVOL will be eventually changed to MPPK2.

A problem in the secondary storage system 400 will now be described. If the responsible MPPK 210 for the remote copy group is changed, the communication between the MPPKs 210 becomes necessary for the process of reading the journal from the JVOL and the process of writing the journal into the SVOL and the performance deteriorates unless the responsible MPPKs 210 for the JVOL and the SVOL are also changed in the secondary storage system 400 as is the case with the primary storage system 300. If the responsible MPPKs 210 for the JVOL and the SVOL are changed before changing the responsible MPPK 210 for the remote copy group, the copy process from the JVOL to the SVOL may become impossible in the middle of execution.

To avoid this problem, the remote copy function changes the responsible MPPK 210 for the remote copy group after completing the process in execution (the creation of the journal, the storage of the journal into the JVOL, and the copy process from the JVOL to the SVOL). After the responsible MPPK 210 for the remote copy group is changed, the responsible MPPKs 210 for the JVOL and the SVOL are changed. As a result, the above problem may be avoided.

Figure 24:
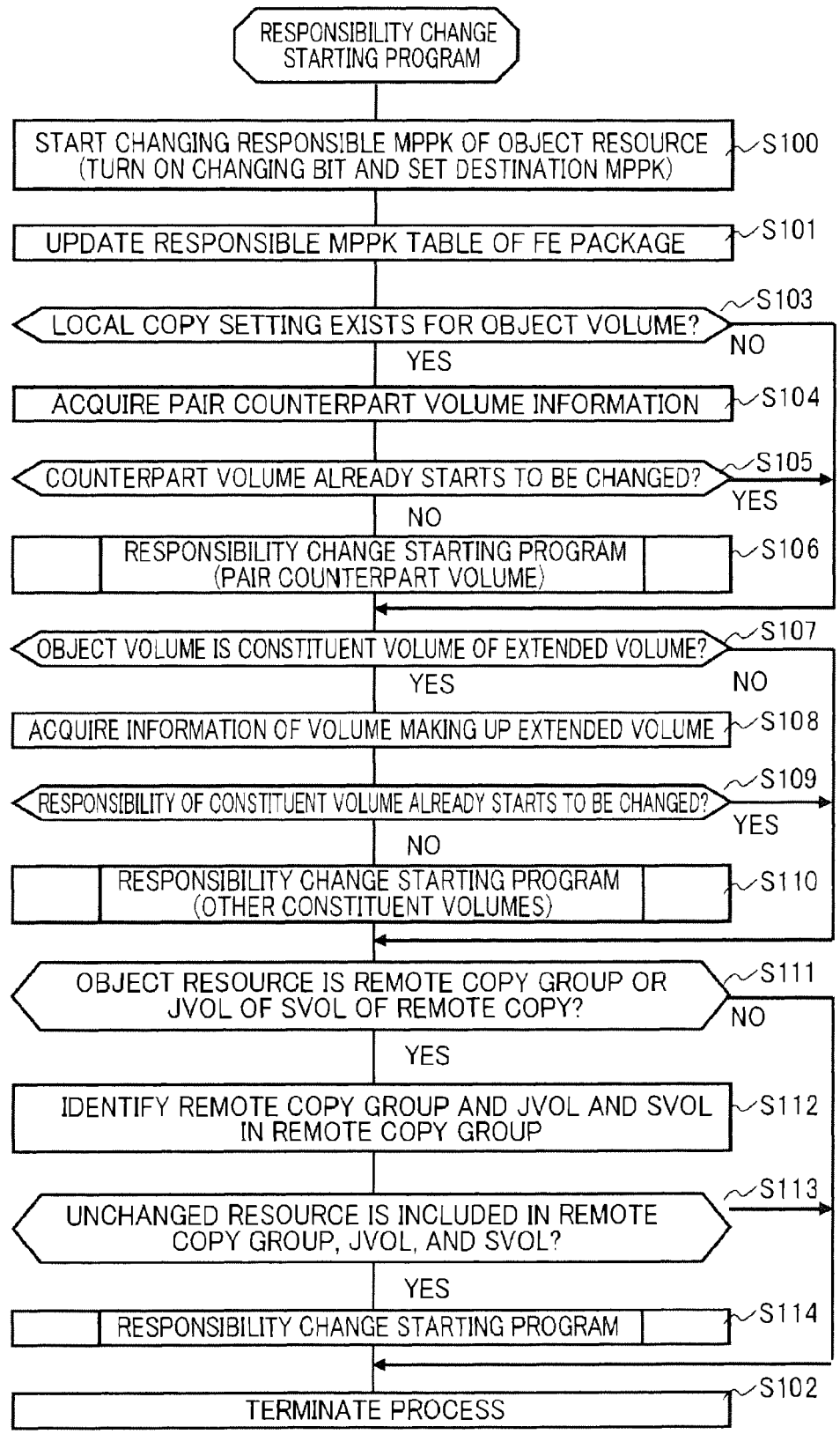
FIG. 24 is a diagram of an example of a process of the responsibility change starting program in consideration of the setting of the remote copy.

An example of a changing method of the responsible MPPK 210 capable of avoiding the above problem will be described with reference to FIGS. 24 and 25. FIG. 24 depicts a program partially modified from the responsibility change starting program 2221 shown in FIG. 18. The process of this remote copy program is implemented by the processor 211 of the storage system 200 executing the responsibility change starting program 2221 and the remote copy program stored in the program unit 222 of the memory package 220. Although it is assumed that the remote copy program is implemented as a portion of the copy program 2230 of FIG. 2 in this example, the remote copy program is not particularly limited to this configuration.

The responsibility change starting program 2221 of FIG. 24 is formed by adding S111 to S114 to the responsibility change starting program 2221 of FIG. 18. If the change object resource is the remote copy group, the SVOL of the remote copy function, or the JVOL, S112 to S114 are executed. If the change object resource is the PVOL or the remote copy group, the change of the responsible MPPK 210 is started by executing S100 and S101. If the change object resource is the remote copy group, the process from S112 to S114 is also executed.

The process from S111 to S114 in the responsibility change starting program 2221 of FIG. 24 will be described. The responsibility change starting program 2221 determines whether the change object resource is the remote copy group, the SVOL of the remote copy, or the JVOL (S111). If it is determined that the change object resource is none of the remote copy group, the SVOL of the remote copy, and the JVOL (S111, No), the responsibility change starting program 2221 terminates the process (S102).

If it is determined at S111 that the change object resource is the remote copy group, the SVOL of the remote copy, or the JVOL (S111, Yes), the responsibility change starting program 2221 acquires information of the remote copy group, the SVOL, or the JVOL related to the change object resource (S112). This process is implemented by the responsibility change starting program 2221 referring to the remote copy table 2215 and the volume table 2211.

The responsibility change starting program 2221 then checks whether any one of the resources acquired at S112 has the responsible MPPK 210 that is not started to be changed (S113). This process is implemented by the responsibility change starting program 2221 referring to the changing bit 22123, 22153 of the responsible MPPK table 2212, 2216. If one or more of the resources (the JVOL, the SVOL, or the remote copy group) are not being changed (S113, Yes), the responsibility change starting program 2221 goes to S114. The responsibility change starting program 2221 calls the responsibility change starting program 2221 for all the resources not being changed to start the change process (S114). Finally, the responsibility change starting program 2221 terminates the process (S102).

Figure 25:
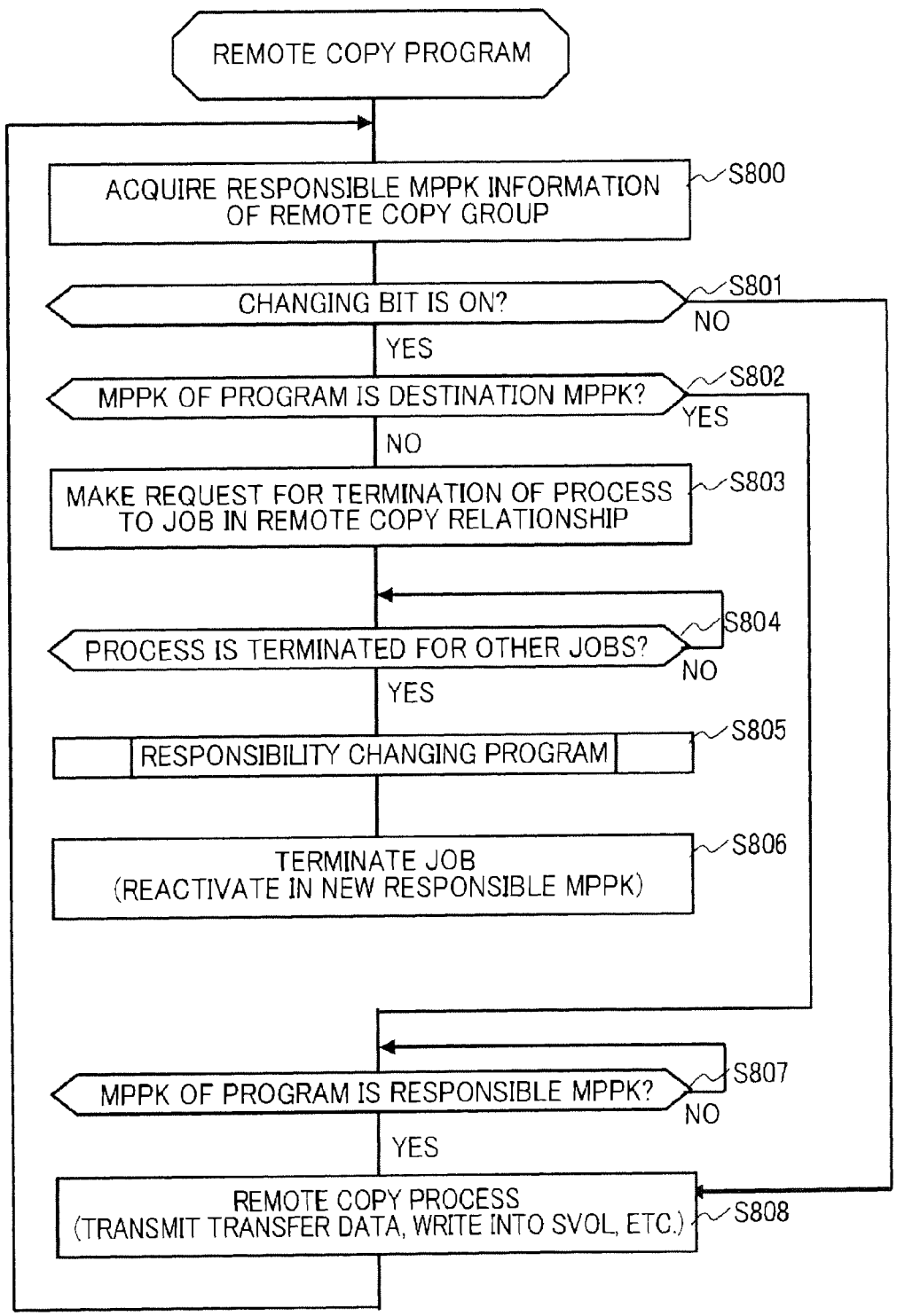
FIG. 25 is a diagram of an example of a process of the remote program for changing a responsible MPPK of a remote copy group.

The process of the remote copy program shown in FIG. 25 is a process of detecting that the responsible MPPK 210 for the remote copy group is being changed during the remote copy process and terminating the remote copy process of the source MPPK 210 to execute the change. The remote copy program is activated for each remote copy group and executes a process of transferring the journal from the primary storage system 300 to the secondary storage system 400, a process of deleting the transferred journal from the JVOL of the primary storage system 300, a remote copy process of instructing the copy program to perform the writing from the JVOL to the SVOL in the secondary storage system 400, and the like.

The remote copy program refers to the responsible MPPK table 2216 to acquire information of the responsible MPPK 210 of the remote copy group of the program (S800) and determines whether the changing bit 22163 of the responsible MPPK table 2216 is ON (S801). If it is determined that the changing bit is OFF (S801, No), the remote copy program executes the remote copy process (such as the transmission of transfer data and the instruction for the writing from the JVOL to the SVOL) (S808) and goes back to S800.

If it is determined that the changing bit is ON (S801, Yes), the remote copy program determines whether the destination MPPK 210 is the MPPK 210 of the remote copy program (S2802). If it is determined that the MPPK 210 of the remote copy program is the destination (S802, Yes), the process of the remote copy program goes to S807 and waits for the responsible MPPK 210 of the remote copy group to change (S807). Once the change of the responsible MPPK 210 of the remote copy group is completed, the remote copy program goes from S807 to S808 to execute the above remote copy process.

On the other hand, if it is determined at S802 that the destination is not the responsible MPPK 210 of the remote copy group (S802, No), the remote copy group terminates the process being executed in the destination MPPK 210 and changes the responsible MPPK 210. Specifically, the remote copy program requests other programs executing the remote copy process to terminate the process (S803). Other programs include the copy program writing data from the JVOL to the SVOL in response to the instruction from the remote copy program, the program deleting the transferred journal from the JVOL of the primary storage system, etc. When receiving the request for terminating the process from the remote copy program, these programs completes the process in execution to terminate the process.

The remote copy program monitors the termination of process of other programs executing the remote copy process (S804). This monitoring process may be implemented by writing the termination of process as control information into the local memory 212 and the control information unit 221 immediately before the termination of process of other programs terminating the process and by referring to the written control information with the remote copy program at S804.

The remote copy program then determines whether the remote copy process of other programs is terminated (S804). If it is determined that the process is terminated (S804, Yes), the remote copy program calls the responsibility changing program 2224 (S805) to terminate the process (S806). The remote copy program is subsequently reactivated in the new responsible MPPK 210 of the remote copy group.

The process flow of the responsibility changing program 2224 called from S805 of the remote copy program shown in FIG. 25 is the same as FIG. 11.

At S400 of FIG. 11, the remote copy table 2215 is written from the local memory 212 to the control information unit 221 of the memory package 220. At S401, the responsible MPPK 210 of the remote copy group is changed. Specifically, the responsibility changing program 2224 changes the responsible MPPK number 22162 of the responsible MPPK table 2216 to the MPPK number 22162 of the new responsible MPPK 210, changes the changing bit 22163 from ON to OFF, and changes the destination MPPK number 22164 to "-" meaning that the destination MPPK 210 does not exist.

Application of Plurality of Storage Functions

A plurality of the storage functions may be applied to the same volume 250. For example, a certain volume 250 may be the SVOL of the remote copy function as well as the PVOL of the local copy function. Even when a plurality of the storage functions is applied to the same volume 250 as above, this example may be applied. Consideration is given to the responsibility change starting program 2221 shown in FIG. 24 and the responsibility change check program 2223 shown in FIG. 15 such that the case of applying a plurality of the storage functions to the same volume 250 can be supported.

The configuration of this example will be described for the case that a certain volume 250 is the SVOL of the remote copy function as well as the PVOL of the local copy function with reference to FIGS. 24 and 15.

If the volume 250 set as the SVOL of the remote copy function is specified as the change object volume 250 and the responsibility change starting program 2221 of FIG. 24 is called, the specified SVOL of the remote copy function and the PVOL of the local copy function start to be changed at S100 of the responsibility change starting program 2221 and the SVOL of the local copy function starts to be changed at S106. The change is then started for the JVOL provided in the remote copy group to which the specified SVOL of the remote copy function belongs and other SVOLs at S111 to S114. Therefore, all the related volumes 250 correctly start to be changed.

If the volume 250 set as the SVOL of the local copy function is specified as the change object volume 250 and the responsibility change starting program 2221 of FIG. 24 is called, the PVOL of the local copy function starts to be changed by calling the responsibility change starting program 2221 at S106 of the responsibility change starting program 2221.

Since the specified volume 250 is the PVOL of the local copy function as well as the SVOL of the remote copy function, the responsibility change starting program 2221 called by specifying the PVOL of the local function starts changing the JVOL provided in the remote copy group to which the SVOL of the remote copy function belongs and other SVOLs at S111 to S114. Therefore, all the related volumes 250 correctly start to be changed.

A process flow of the responsibility change check program 2223 will now be described with reference to FIG. 15. S602 to S604 of FIG. 15 are the change check conditions of the local copy function and S608 to S610 are the change check conditions of the remote copy function. Description will be made of the case that the volume 250 to be checked by these change check conditions is the SVOL of the remote copy function as well as the PVOL of the local copy function.

Firstly, the responsibility change check program 2223 checks the responsibility change check condition of the local copy function at S604. If the condition is satisfied (S604, No), the responsibility change check program 2223 goes through S605 to S608. This is because the volume 250 to be checked by the responsibility change check conditions is also the SVOL of the remote copy function. The responsibility change check program 2223 checks the change check condition of the remote copy at S608 to S610. If the condition is not satisfied (S610, No), the responsibility change check program 2223 terminates the process. Since the check condition of the remote copy function is not satisfied although the check condition of the local copy function is satisfied, the responsibility is not changed.

As above, if a plurality of the storage functions is applied to the same volume 250, the responsible MPPK may be changed only when all the responsible MPPK change conditions of the plurality of the storage functions are satisfied.

Example 2

Example 2 for implementing the preset invention will now be described. In the Example 1, a process mode has been described that changes the responsible MPPK 210 in consideration of the setting of the storage functions to the volume 250. In this example, description will be made of a method of giving consideration to the setting of the storage functions and the process costs of the storage functions to implement the more accurate cost distribution when the costs of the MPPK 210 are biased.

The cost distribution in consideration of the storage function process costs will first be described. The process costs may be biased among the MPPKs 210 due to changes in an amount of the IO requests issued from the host 100 to the storage system 200. In this case, to equally distributing the costs among the MPPKs 210, the responsible MPPK 210 of the resource (the volume 250, the remote copy group) having the process allocated to the high-cost MPPK 210 may be changed to the low-cost MPPK 210 to prevent the costs from concentrating on a certain MPPK 210.

If the responsible MPPK 210 is changed for the volume 250 having little IO request issued from the host 100, the costs of other MPPK 210 are not so affected. Therefore, the object resource of the change of the responsible MPPK 210 must be selected such that the costs will be made equal among the MPPK 210 by changing the responsible MPPK 210 as far as possible.

A method of calculating the cost of each of the MPPKs 210 in this example will be described. The cost of the volume 250 may be calculated by a calculation equation "write count of the volume 250\*write process cost+read count of the volume 250\*read process cost" in the case of the normal volume 250 with no storage function applied, for example. To correctly express the current cost, the write count of the volume 250 may be the write count of previous one second instead of the total write count from the time of creation of the volume 250.

If the storage function is applied to the object volume 250, the process cost specific to the storage function must be considered in the cost calculation. Specifically, for example, the process cost specific to the storage function includes the cost of the copy process from the PVOL to SVOL in the case of the local copy function and the cost of the process of deleting the transfer data from the JVOL.

A total cost of one MPPK 210 is calculated as a total cost of all the volumes 250 handled by the MPPK 210 and all the remote copy groups.

Description will hereinafter be made of a method of detecting the bias of the costs among the MPPKs 210, a method of calculating the costs of the MPPKs 210, and the control information required for these processes necessary for the cost distribution process through the change of the responsible MPPK 210 in consideration of the setting status of the storage function and the process cost of the storage function of the volume 250. The configuration of the information processing system 1 including host 100 and the storage system 200 is the same as the Example 1.

Figure 28:
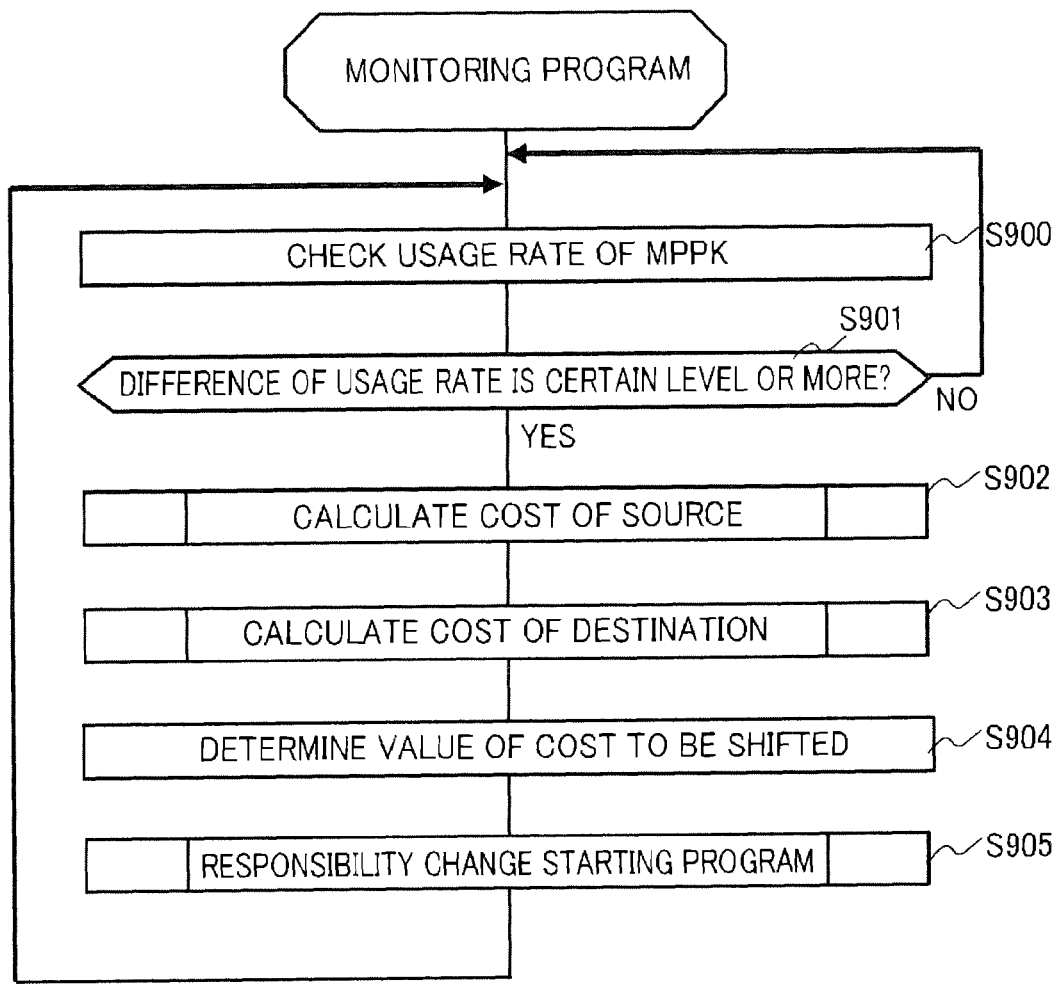
FIG. 28 is a diagram of an example of a process of a monitoring program that monitors a bias of cost between MPPKs.

Firstly, a process of detecting the bias of the costs of the MPPKs 210 will be described with reference to FIGS. 26, 27, and 28. FIG. 26 depicts an example of an MPPK usage rate table 2217 managing the usage rate of the processor 211 of the MPPK 210. FIG. 27 depicts an example of the processing cost table 2218 for managing the processing costs (described later) of various processes executed by the MPPK 210. FIG. 28 depicts an example of a process flow of the monitoring program 2225 for checking the usage rate of the MPPKs 210 to determine whether the costs are biased.

The MPPK usage rate table 2217 includes an MPPK number field 22171 and a usage rate field 22172. The MPPK number field 22171 records the MPPK number that is the identification code for identifying the MPPKs 210. The usage rate field 22172 records the usage rate of the MPPK 210 identified by the MPPK number 22171 in percentage. In this example, to represent the current usage rate of the MPPK 210, for example, the usage rate of previous one second is acquired from the MPPKs 210 by the monitoring program 2225 (described later) and is recorded in the usage rate field 2217 on a timely basis.

The processing cost table 2218 includes a processing type field 22181 and a processing cost field 22182. The processing type field 22181 records a processing type representing a type of the process executed by the MPPK 210. In this example, the processing type field 22181 records, as shown in FIG. 27, a normal volume read, a normal volume write, an extended volume read, an extended volume write, a PVOL read of local copy, a PVOL write of local copy, a copy process on the PVOL side of local copy, a copy process on the SVOL side of local copy, a PVOL read of remote copy, a PVOL write of remote copy, an SVOL read of remote copy, an SVOL write of remote copy, a journal creation process of remote copy, a journal transfer process (copy source) of remote copy, a journal deletion process of remote copy, a journal transfer process (copy destination) of remote copy, a writing journal determining process of remote copy, and a journal writing process of remote copy. These processing types are not exhaustive and may be added or deleted as needed depending on the system conditions, etc.

The processing cost field 22182 records the processing cost that is a time period of using the processor 211 for executing each of the processes recorded in the processing type field 22181. The example of FIG. 27 represents that the processor 211 of the MPPK 210 is used for 10 microseconds to execute the read process of the normal volume 250. The normal volume 250 represents the volume having no storage function applied. The processing cost 22182 may be preliminarily be registered in the storage system 200 from the maintenance terminal 270, etc., or the monitoring program in the storage system 200 may actually measure the processing times at the time of execution of the processes.

FIG. 28 depicts an example of a process of the monitoring program 2225 for detecting the bias of costs among the MPPKs 210 to determine a resource having the responsible MPPK 210 to be changed. The process of the monitoring program 2225 may be implemented by the processor 211 of the storage system 200 executing the monitoring program 2225 stored in the program unit 222 of the memory package 220.

The monitoring program 2225 refers to the MPPK usage rate table 2217 to acquire the usage rate 22172 of each of the MPPKs 210 (S900). The monitoring program 2225 determines whether a difference of the usage rate between the MPPK 210 with the highest usage rate 22172 and the MPPK 210 with the lowest usage rate 22172 is equal to or more than a predetermined threshold value (S901). If it is determined that the difference of the usage rate is smaller than the threshold value (S901, No), it is determined that the cost distribution process among the MPPKs 210 is not necessary and the process goes back to S900.

On the other hand, if it is determined that the difference of the usage rate is equal to or more than the threshold value (S901, No), the responsible MPPK 210 having the process handled by the MPPK 210 with the highest usage rate 22172 is changed to the MPPK 210 with the lowest usage rate 22172 to distribute the costs.

A process for determining the resource having the responsible MPPK 210 to be changed for the cost distribution among the MPPKs 210 will be described.

Firstly, the monitoring program 2225 calculates the current total cost of the MPPK 210 with the highest usage rate 22172 and the current total cost of the MPPK 210 with the lowest usage rate 22172 (S902, S903). The calculation of costs is implemented by the cost calculation program 2226 described later.

The monitoring program 2225 determines what level of the cost of the resource the responsible MPPK 210 should be changed for to equalize the costs of the MPPKs 210 (S904).

For example, the monitoring program 2225 may be configured to change the responsible MPPK 210 of the resource having the cost of "(total cost of the source MPPK 210−cost of the destination MPPK 210)/2". Considerations may be given not only to the total cost of the source MPPK 210 and the total cost of the destination MPPK 210 but also the total cost of other MPPKs 210. For example, the average cost of all the MPPKs 210 is calculated and the monitoring program 2225 may be configured to change the responsible MPPK 210 of the resource having the cost of "total cost of the source MPPK 210−average cost".

A method of selecting the object resource for the change of the responsible MPPK 210 from the source MPPK 210 to the destination MPPK 210 will now be described.

In this case, the monitoring program 2225 selects a resource having a value of the cost obtained by the calculation of S904. If it is determined that no resource has the cost equivalent to the value of the calculation result of S904, a resource having the maximum cost not exceeding the value of the calculation result is selected. Alternatively, a plurality of resources having the total cost equivalent to the above calculation result may be obtained and defined as the change objects.

If the responsible MPPKs 210 of resources are matched by the storage function, for example, if the responsible MPPKs 210 of the PVOL and the SVOL of the local copy are the same MPPK 210, the total cost of the PVOL and the SVOL is handled as one unit of change in this example since the responsible MPPKs 210 of the PVOL and the SVOL are changed at the same time. In this example, the cost of each unit of change is calculated and listed by the cost calculation program 2226 described later.

Finally, the monitoring program 2225 starts changing the responsible MPPK 210 of the resource determined at S904 (S905). At S905, the monitoring program 2225 calls the responsibility change starting program 2221 shown in FIG. 24.

The cost calculation program 2226 called from S902 and S903 of the monitoring program 2225 will be described with reference to FIGS. 29 to 32.

Figure 29:
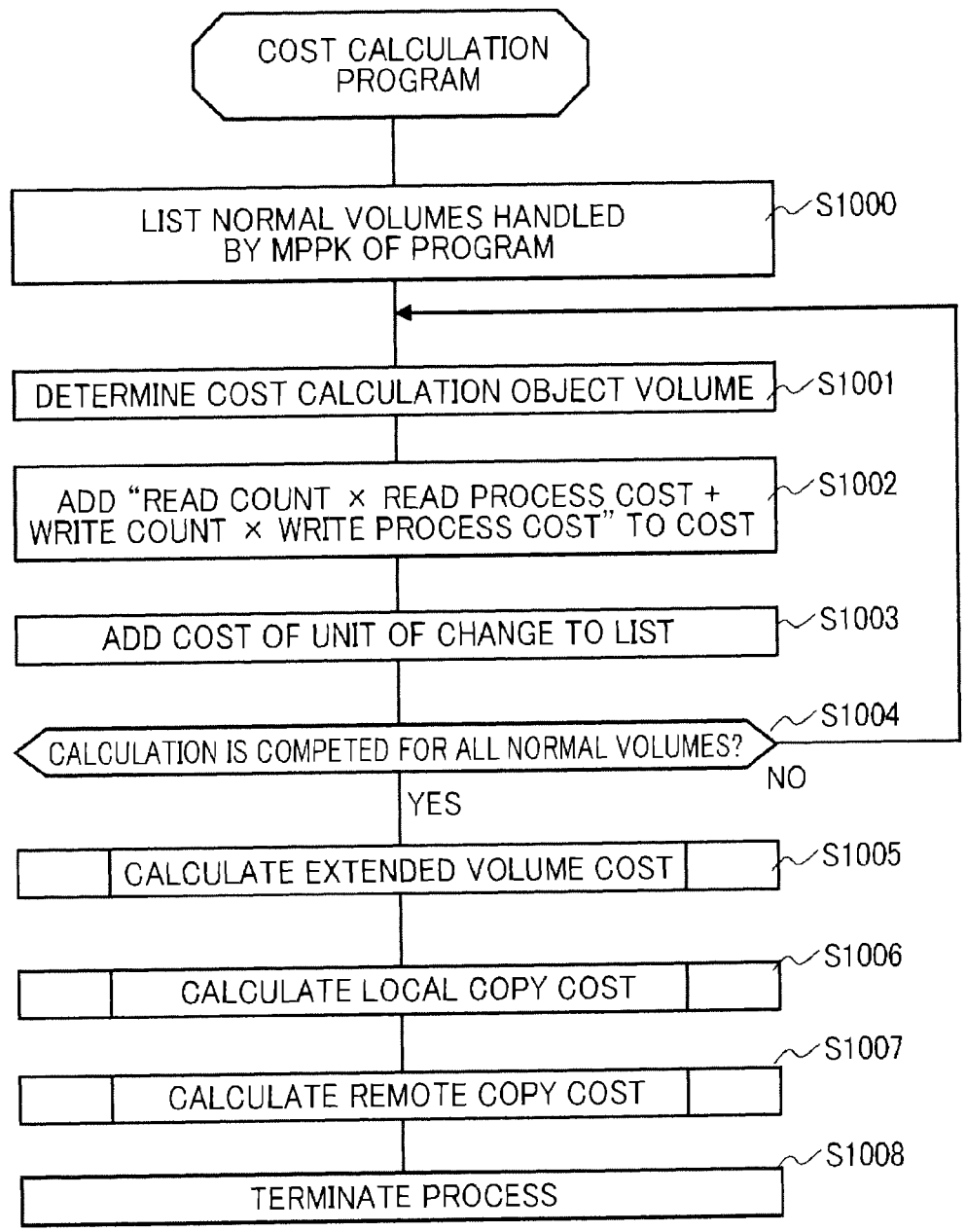
FIG. 29 is a diagram of an example of a process of a cost calculation program.
Figure 30:
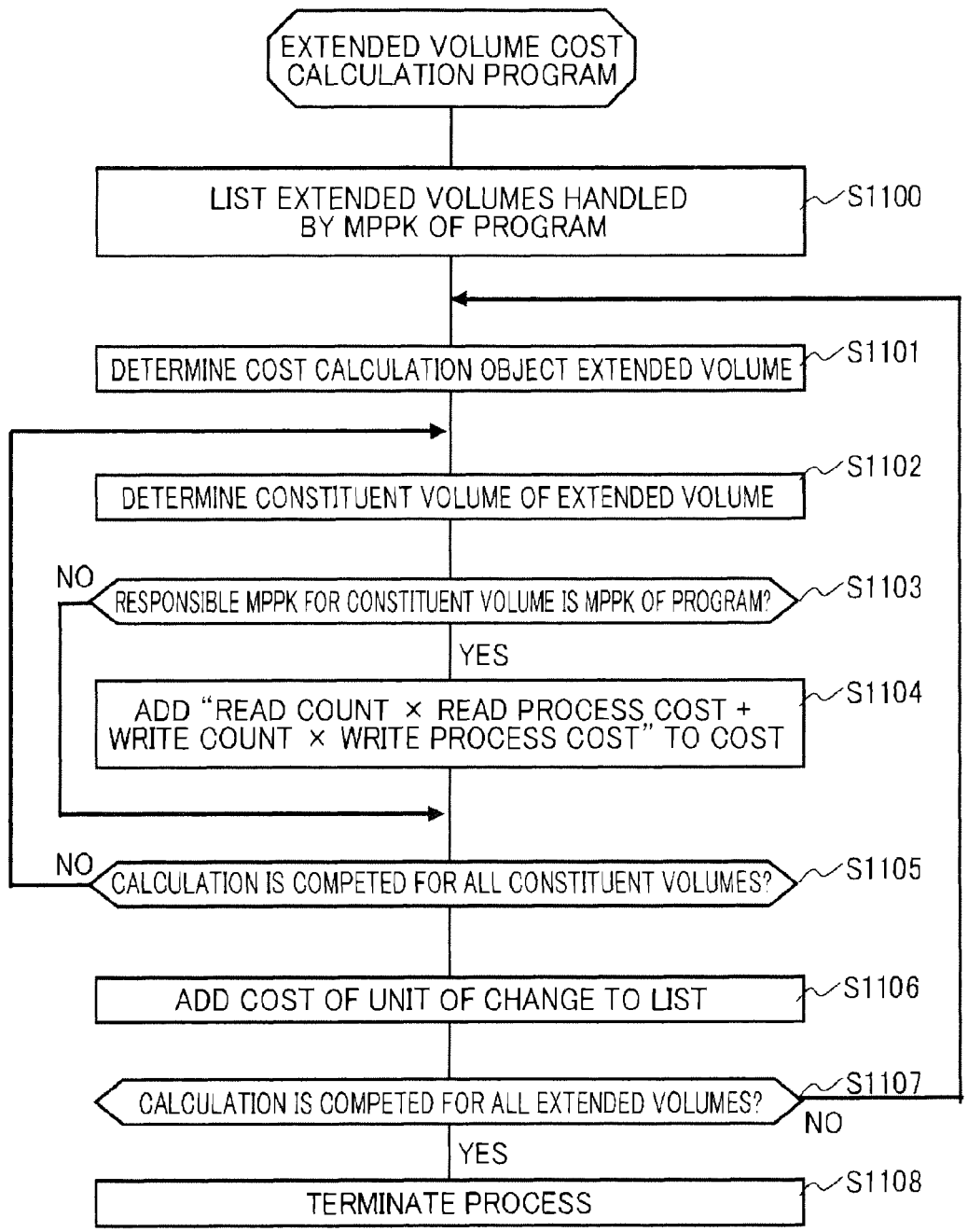
FIG. 30 is a diagram of an example of a process of an extended volume cost calculation program that calculates a cost of an extended volume.
Figure 31:
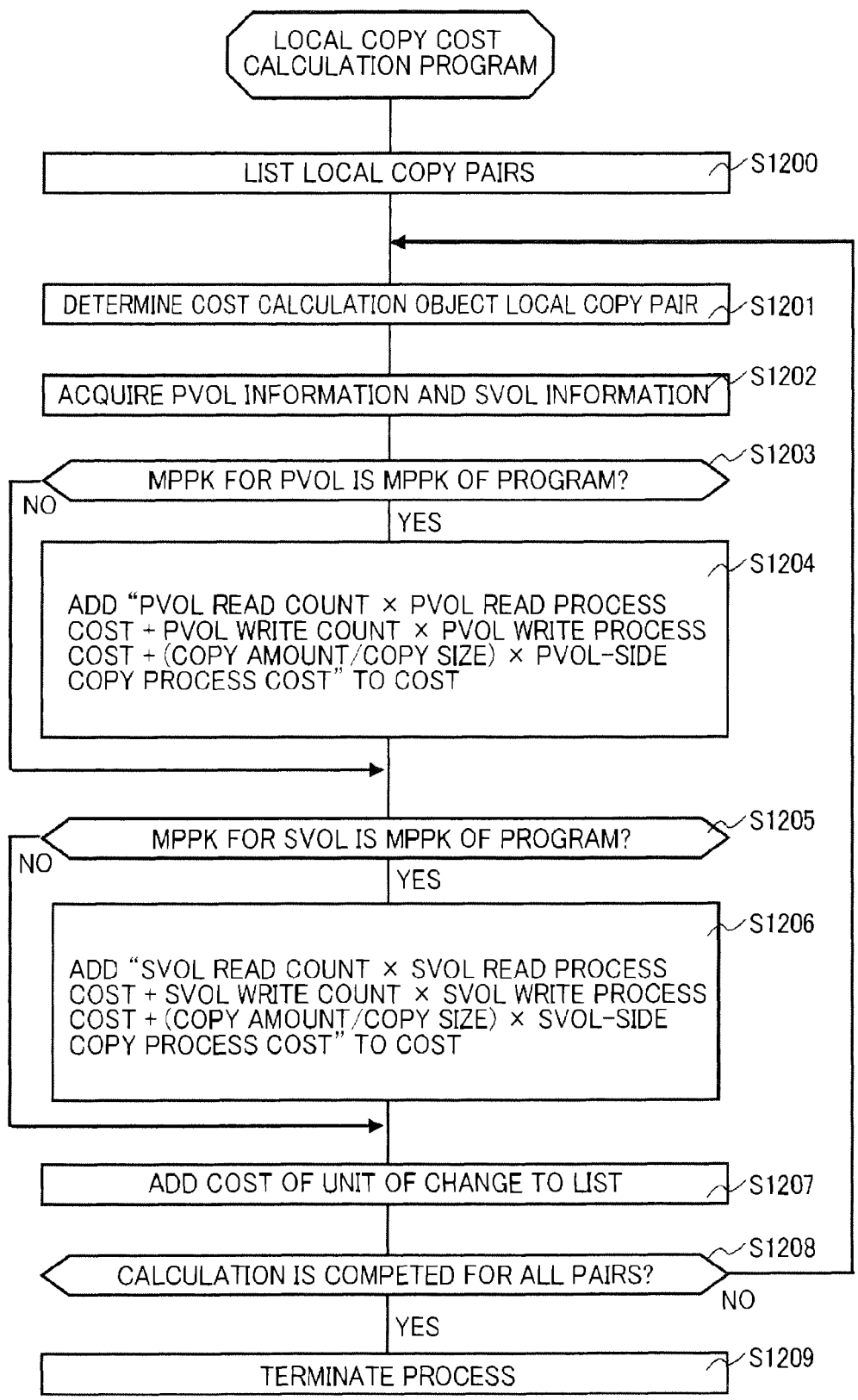
FIG. 31 is a diagram of an example of a process of a local copy cost calculation program that calculates a cost of local copy.
Figure 32:
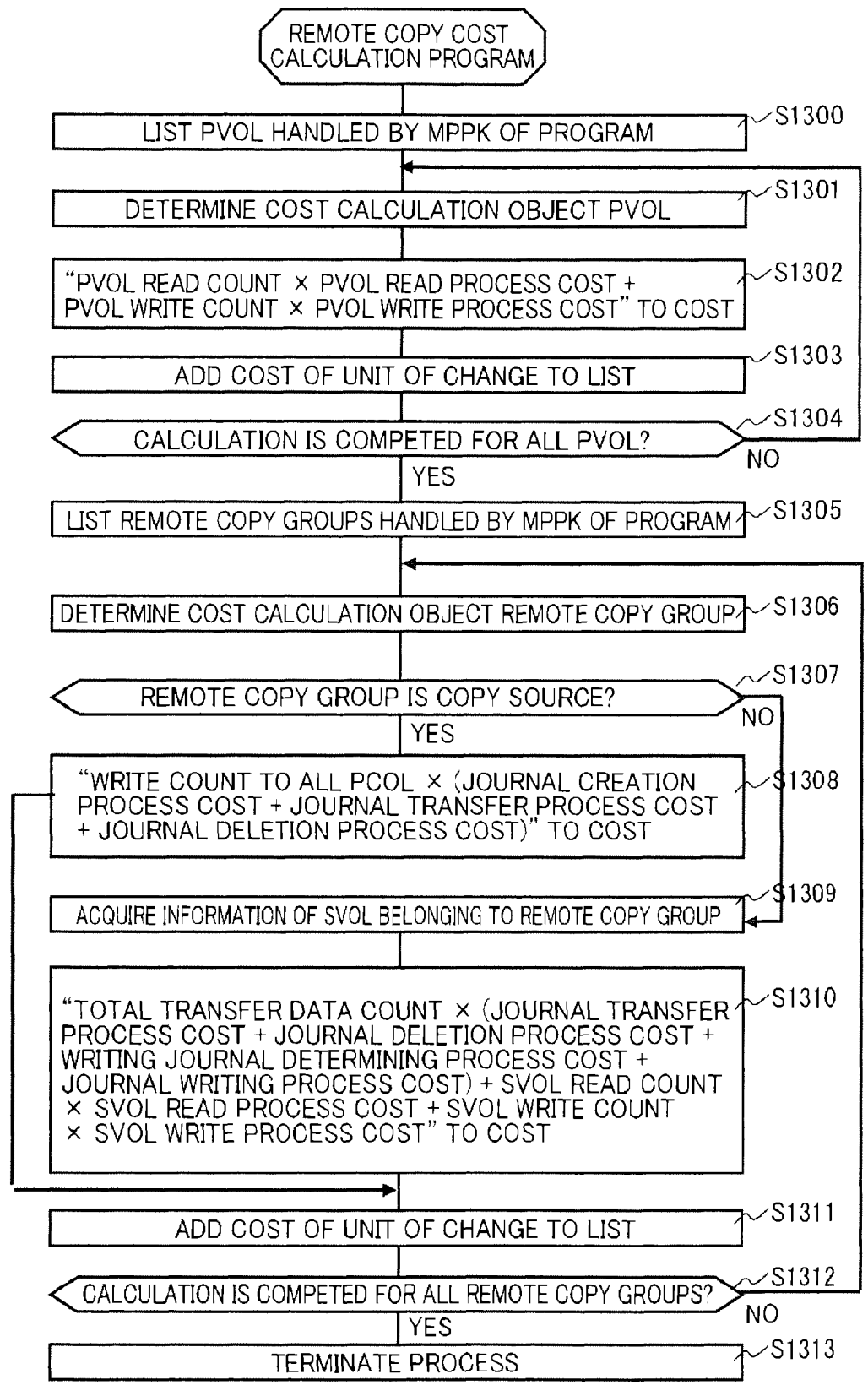
FIG. 32 is a diagram of an example of a process of a remote copy cost calculation program that calculates a cost of remote copy.

FIG. 29 depicts an example of a process flow of the cost calculation program 2226; FIG. 30 depicts an example of a process flow of the extended volume cost calculation program 2227; FIG. 31 depicts an example of a process flow of the local copy cost calculation program 2228; and FIG. 32 depicts an example of a process flow of the remote copy cost calculation program 2229. The processes of these programs are implemented by the processor 211 of the storage system 200 executing the cost calculation program 2226, the extended volume cost calculation program 2227, the local copy cost calculation program 2228, and the remote copy cost calculation program 2229 stored in the program unit 222 of the memory package 220.

Firstly, the cost calculation program 2226 lists the normal volumes 250 handled by the MPPK 210 of the program (S1000). This process is implemented by searching the volume 250 having the function bit 22112 of "-" from the volume table 2211 and referring to the responsible MPPK table 2212 to determine whether the responsible MPPK 210 of the volume 250 is the MPPK 210 of the program.

The cost calculation program 2226 executes the process from S1001 to S1004 for each of the listed normal volumes 250 to calculate the total cost. The cost calculation program 2226 determines one of the volumes 250 to be subjected to the cost calculation (S1001). The cost of this volume 250 is calculated and added to the total cost (S1002). This cost calculation process may be performed with the use of the values of the write count 22114 and the read count 22115 in the volume table 2211 and the processing cost of the normal volume read and the processing cost of the normal volume write in the processing cost table 2218 as above.

The cost calculation program 2226 adds the cost of the volume 250 determined at S1001 to a list to create a list of costs on the basis of the volumes 250 acting as a unit of change of the responsible MPPK 210 (S1003). This list is utilized to determine which resource the responsible MPPK 210 is changed for at S904 of the monitoring program 2225.

The cost calculation program 2226 determines at S1000 whether the calculation is completed for all the listed normal volumes 250 (S1004). If the calculation is completed for not all the normal volumes 250, the cost calculation program 2226 goes back to S1001 to calculate the cost of another volume 250 not subjected to the cost calculation.

On the other hand, if the calculation is completed for all the normal volumes 250, the cost calculation program 2226 executes the process from S1005 to S1007 to calculate the cost of the extended volume, the cost of the local copy, and the cost of the remote copy and terminates the process (S1008).

The extended volume cost calculation program 2227 called from the cost calculation program 2226 will be described with reference to FIG. 30.

The extended volume cost calculation program 2227 lists the extended volumes having at least one constituent volume 250 handled by the MPPK 210 of the program (S1100). This process is implemented by the extended volume cost calculation program 2227 referring to the extended volume table 2214 and the responsible MPPK table 2212.

The extended volume cost calculation program 2227 executes the process from S1101 to S1105 for the listed extended volumes to calculate the total cost. The extended volume cost calculation program 2227 determines one extended volume to be subjected to the cost calculation (S1101). The extended volume cost calculation program 2227 then determines one of the constituent volumes 250 making up the extended volume (S1102). If the responsible MPPK 210 of this volume 250 is the MPPK 210 of the program, the cost of the volume 250 is calculated and added to the total cost (S1103, S1104). This cost calculation process may be performed with the use of the values of the write count and the read count in the volume table 2211 and the processing cost of the extended volume read and the processing cost of the extended volume write in the processing cost table 2218.

The extended volume cost calculation program 2227 determines at S1105 whether the calculation is completed for all the constituent volumes 250 making up the extended volume determined at S1101 (S1105). If it is determined that the calculation is not completed for all the constituent volumes 250 (S1105, No), the extended volume cost calculation program 2227 goes back to S1102 to calculate the cost of another constituent volume 250 not subjected to the cost calculation. This process is implemented by referring to the volume table 2211 and the processing cost table 2218 as is the case with the calculation for the normal volumes.

On the other hand, if it is determined that the calculation is completed for all the constituent volumes 250 (S1105, Yes), the extended volume cost calculation program 2227 adds a total of the costs calculated at S1104 to a list to create a list of total costs of a plurality of the constituent volumes 250 (unit of change) having the responsible MPPKs 210 to be changed at the same time as is the case with the normal volumes (S1106). In the case of the extended volume, if all the constituent volumes 250 have the same responsible MPPK 210, the total cost of all the constituent volumes 250 is added to the list.

The extended volume cost calculation program 2227 determines whether the calculation is completed for all the extended volumes (S1107). If it is determined that the calculation is completed for all the extended volumes (S1107, Yes), the extended volume cost calculation program 2227 terminates the process (S1108). If it is determined that the calculation is not completed for all the extended volumes (S1107, No), the extended volume cost calculation program 2227 goes back to S1101 to calculate the cost of another extended volume not subjected to the cost calculation.

The local copy cost calculation program 2228 called from the cost calculation program 2226 will be described with reference to FIG. 31.

The local copy cost calculation program 2228 lists the local copy pairs having the PVOL or the SVOL of the local copy function handled by the MPPK 210 of the program (S1200). This process is implemented by the local copy cost calculation program 2228 referring to the local copy table 2213 and the responsible MPPK table 2212.

The local copy cost calculation program 2228 executes the process from S1201 to S1206 for the listed local copy pairs to calculate the total cost. The local copy cost calculation program 2228 determines one local copy pair to be subjected to the cost calculation (S1201) and acquires the PVOL information and the SVOL information of the local copy (S1202). The local copy cost calculation program 2228 determines whether the responsible MPPK 210 of the PVOL acquired at S1202 is the MPPK 210 of the program (S1203).

If it is determined that the responsible MPPK 210 of the PVOL is the MPPK 210 of the program (S1203, Yes), the cost of the PVOL is calculated and added to the total cost (S1204). The local copy cost calculation program 2228 further determines whether the responsible MPPK 210 of the SVOL acquired at S1202 is the MPPK 210 of the program (S1205). If it is determined that the responsible MPPK 210 of the SVOL is the MPPK 210 of the program (S1205, Yes), the cost of the SVOL is calculated and added to the total cost (S1206). The local copy cost calculation program 2228 may calculate the total cost of the PVOL and the SVOL handled by the MPPK 210 of the program among the PVOLs and the SVOLs determined at S1202 through the process from S1203 to S1206.

In the cost calculation for the local copy, the copy cost from the PVOL to the SVOL must also be considered unlike the cases of the normal volume 250 and the extended volume. In this example, the local copy cost calculation program 2228 calculates the copy cost from the PVOL to the SVOL by (the number of times of copy from the PVOL to the SVOL (calculated by (total copy amount/copy size))*cost of one copy process).

If the responsible MPPK 210 for the PVOL is different from the responsible MPPK 210 for the SVOL, the copy process from the PVOL to the SVOL is implemented by the two MPPKs 210. Therefore, the above calculation result does not represent the cost of one MPPK 210. To correctly calculate each of the cost of the responsible MPPK 210 for the PVOL and the cost of the responsible MPPK 210 for the SVOL, the processing cost field 22182 of the processing cost table 2218 stores the copy processing cost of the responsible MPPK 210 of the PVOL and the copy processing cost of the responsible MPPK 210 of the SVOL corresponding to the PVOL-side copy process and the SVOL-side copy process of the processing type field 22181, respectively. In the cost calculation of the responsible MPPK 210 for the PVOL, the cost is calculated by (the number of times of copy*copy processing cost on the PVOL side), and in the cost calculation of the responsible MPPK 210 for the SVOL, the cost is calculated by (the number of times of copy*copy processing cost on the SVOL side).

The local copy cost calculation program 2228 adds a total of the costs calculated at S1204 and S1206 to a list to create a list of total costs of the volumes 250 (unit of change) having the responsible MPPKs 210 required to be changed at the same time as is the case with the normal volumes 250 (S1207). If the responsible MPPKs 210 of the PVOL and the SVOL are the same MPPK 210, the total cost (the cost of the pair) of the PVOL and the SVOL is added to the list.

The local copy cost calculation program 2228 determines whether the calculation is completed for all the local copy pairs (S1208). If it is determined that the calculation is not completed for all the local copy pairs (S1208, No), the local copy cost calculation program 2228 goes back to S1201 to calculate the cost of another local copy pair not subjected to the cost calculation.

On the other hand, if it is determined that the calculation is completed for all the local copy pairs (S1208, Yes), the local copy cost calculation program 2228 terminates the process (S1209).

The remote copy cost calculation program 2229 called from the cost calculation program 2226 will be described with reference to FIG. 32.

The remote copy cost calculation program 2229 calculates the IO process cost of the PVOL in the process from S1300 to S1304. The remote copy cost calculation program 2229 calculates the cost of the remote copy process and the IO process cost of the SVOL in the process from S1305 to S1313. The cost of the remote copy process includes, for example, a process of creating and storing the journal into the JVOL, a process of transferring the journal from the primary storage system 300 to the secondary storage system 400, and a process of deleting the transferred journal from the JVOL of the primary storage system 300.

Firstly, the calculation of the IO process cost of the PVOL will be described. The remote copy cost calculation program 2229 lists the PVOLs handled by the MPPK 210 of the program (S1300). The remote copy cost calculation program 2229 determines one PVOL to be subjected to the cost calculation (S1301) and calculates and adds the cost of the PVOL to the total cost (S1302).

This cost calculation process may be performed with the use of the values of the write count and the read count in the volume table 2211 and the processing cost of the PVOL read of the remote copy and the processing cost of the PVOL write of the remote copy in the processing cost table 2218.

The remote copy cost calculation program 2229 adds the cost of the PVOL determined at S1301 to a list to create a list of costs on the basis of the PVOLs acting as a unit of change of the responsible MPPK 210 (S1303). This list is utilized to determine which resource the responsible MPPK 210 is changed for at S904 of the monitoring program 2225.

The remote copy cost calculation program 2229 determines whether the calculation is completed for all the PVOLs listed at S1300 (S1304). If it is determined that the calculation is not completed for all the PVOLs (S1304, No), the remote copy cost calculation program 2229 goes back to S1301 to calculate the cost of another PVOL not subjected to the cost calculation.

On the other hand, if it is determined that the calculation is completed for all the PVOLs (S1304, Yes), the remote copy cost calculation program 2229 goes to S1305 to calculate the cost of the remote copy process and the IO process cost of the SVOL.

The calculation of the cost of the remote copy process and the IO process cost of the SVOL will be described. The remote copy cost calculation program 2229 refers to the responsible MPPK table for remote copy 2216 to list the remote copy groups handled by the MPPK 210 of the program (S1305). The remote copy cost calculation program 2229 determines one remote copy group to be subjected to the cost calculation (S1306) and refers to the attribute field 22152 of the remote copy table 2215 to determine whether the remote copy group is the source remote copy group or the destination remote copy group (S1307).

If it is determined that the remote copy group determined at S1306 is the source remote copy group (S1307, Yes), the cost of the remote copy process executed by the copy source is calculated at S1308 and the process goes to step S1311. On the other hand, if it is determined that the remote copy group determined at S1306 is not the destination remote copy group (S1307, No), the SVOL belonging to the remote copy group determined at S1306 and handled by the MPPK 210 of the program is identified (S1309), and the cost of the remote copy process executed in the copy destination and the IO process cost of the SVOL are calculated (S1310). The process then goes to S1311.

The remote copy cost calculation program 2229 refers to the volume table 2211 to calculate the total write count of all the PVOLs belonging to the remote copy group determined at S1306. The remote copy cost calculation program 2229 then calculates (calculated write count*(journal creation process cost+journal transfer process cost+journal deletion process cost)). Finally, the calculation result is added to the total cost.

At S1310, the remote copy cost calculation program 2229 refers to the volume table 2211 to calculate (the total number of journals received from the source remote copy group by the remote copy group determined at S1306*(journal transfer process cost+journal deletion process cost+writing journal determining process cost+journal writing process cost)+SVOL read count*SVOL read process cost+SVOL write count*SVOL write process cost). The calculation result is added to the total cost.

The remote copy cost calculation program 2229 adds the cost calculated at S1308 or S1309 to a list to create a list of total costs of the resources (unit of change) having the responsible MPPKs 210 required to be changed at the same time as is the case with the normal volumes 250 (S1311).

If the remote copy group is the copy source, the total cost of the remote copy process calculated at S1308 is added to the list. If the remote copy group is the copy destination, the total of the cost of the remote copy process calculated at S1310 and the IO process cost of the SVOL is added to the list.

The total write count of the PVOL may be acquired by referring to the volume table 2211 as above. The process costs of the processes may be acquired by referring to the process cost table 2218. The total number of journals received from the source remote copy group by the destination remote copy group may be acquired since the responsible MPPK 210 for the remote copy group records the number into the remote copy table 2215, for example.

Lastly, the remote copy cost calculation program 2229 determines whether the calculation is completed for all the listed remote copy groups (S1312). If it is determined that the calculation is not completed for all the remote copy groups (S1312, No), the remote copy cost calculation program 2229 goes back to S1306 to calculate the cost of another remote copy group not subjected to the cost calculation.

On the other hand, if it is determined that the calculation is completed for all the remote copy groups (S1312, Yes), the remote copy cost calculation program 2229 terminates the process (S1313).

In conclusion, according to the embodiment of the present invention, a responsible MPPK of a volume is changed in consideration of the storage function setting status for the volume. A resource having the responsible MPPK to be changed and the MPPK after the changing are determined in consideration of the processing cost of the storage function. Therefore, performance may be prevented from deteriorating due to the changing of the responsible MPPK for the volume applied with the storage function. As compared to the case of not considering the storage function, the cost distribution may be equalized between MPPKs. Therefore, the usage rate of MPPK can be improved.

Although the present invention has been described in terms of the examples thereof with reference to the accompanying drawings, the present invention is not limited to these examples. All modifications and equivalents not departing from the spirit of the present invention fall within the range of the present invention.

The invention claimed is:

1. A storage system having a storage device that includes a storage medium providing a plurality of unit logical storage areas used as data storage areas of an external apparatus and a plurality of processing devices communicatively coupled to the storage device to execute data IO processes for the unit logical storage areas from the external apparatus, the storage system comprising:
   a responsible processing device retaining unit configured to retain the unit logical storage areas and the processing devices executing the data IO processes of the unit logical storage areas in a correlated manner;
   a storage function retaining unit configured to retain the unit logical storage areas and storage function information that is information set for the unit logical storage areas to indicate the usage aspects of the unit logical storage areas in a correlated manner; and
   a processing device changing unit configured to acquire from the responsible processing device retaining unit the processing device responsible for data processes related to the logical storage areas based on the storage function set for the unit logical storage areas acquired from the storage function retaining unit for the unit logical storage areas to determine whether the same processing device is responsible for the unit logical storage areas, the processing device changing unit configured to change the processing device responsible for different one of the unit logical storage areas such that any one of the processing devices responsible for the unit logical storage areas becomes responsible for the different one of the unit logical storage areas if it is determined that the same processing device is not responsible.

2. The storage system of claim 1, further comprising
   a processor usage rate retaining unit configured to acquire and retain the processing devices and the usage rates of processors executing the data IO processes included, in the processing devices in a correlated manner,
   a cost information retaining unit configured to retain cost information indicative of costs imposed on the processors for each data process executed by the storage function identified by the storage function information correlated with the unit logical storage areas, and
   a cost calculating unit configured to retain a data write count to each of the unit logical storage areas and a data read count from each of the unit logical storage areas per unit time for the unit logical storage areas not set up with the storage function among the unit logical storage areas with responsibilities taken by the processing devices to calculate a total cost required for the data process of the unit logical storage areas not set up with the storage function from the data write count and the data read count and the cost information required for single data write and data read acquired from the cost information retaining unit, wherein
   if it is determined that data IO process in execution exists for the unit logical storage areas, the processing device changing unit is configured to suspend the change of the processing device until the data IO process in execution no longer exists, wherein
   if the unit logical storage areas are set up with a local copy function that is a function of copying data stored in the unit logical storage area into different one of the unit logical storage areas in the same storage system, when the processing device responsible for one of the unit logical storage areas is changed, the processing device changing unit is configured to change the processing device responsible for the different one of the unit logical storage areas to the processing device that is the destination of the one of the unit logical storage areas, wherein
   the unit logical storage areas are set up with an extended storage area function providing an extended storage area that is one logical storage area created by a plurality of the unit logical storage areas for the external apparatus and if it is determined that the unit logical storage areas are unit logical storage areas making up the extended storage area, and when the processing device responsible for any one of the unit logical storage areas making up the extended storage area is changed, the processing device changing unit is configured to change the processing device responsible for different one of the unit logical storage areas making up the extended storage area to the processing device that is the destination of the change, wherein
   the unit logical storage areas are set up with a remote copy function configured with a primary storage area that normally processes data IO of the external apparatus, a secondary storage area to which the data stored in the primary storage area at a certain time point is copied, and a temporary storage area that temporarily stores data copied from the primary storage area to the secondary storage area, and a primary remote copy group is made up of the primary storage area and the temporary storage area and a secondary remote copy group is made up of the secondary storage area and the temporary storage area, and the processing device changing unit is configured to change the processing device responsible for the primary remote copy group to the processing device that is the destination responsible for the temporary storage area when the processing device responsible for the temporary storage area belonging to the primary remote copy group is changed, and is configured to change the processing device responsible for the secondary remote copy group to the processing device that is the destination responsible for the temporary storage area when the processing device responsible for the temporary storage area belonging to the secondary remote copy group is changed, and wherein if the usage rates of the processors of the processing devices are acquired from the processor usage rate retaining unit and compared with each other and if it is determined that the comparison result satisfies a predetermined condition, the processing device changing unit is configured to calculate the cost information of the unit logical storage area acquired from the cost information retaining unit for each of the processing devices to determine the destination processing device such that the cost information of the processing devices is equalized.

3. The storage system of claim 1, further comprising a processor usage rate retaining unit configured to acquire and retain the processing devices and the usage rates of processors executing the data IO processes included in the processing devices in a correlated manner, and a cost information retaining unit configured to retain cost information indicative of costs imposed on the processors for each data process executed by the storage function identified by the storage function information correlated with the unit logical storage areas, wherein the processing device changing unit is configured to acquire the usage rates of the processors of the processing devices from the processor usage rate retaining unit and compares with each other, and if it is determined that the comparison result satisfies a predetermined condition, the processing device changing unit is configured to calculate the cost information of the unit logical storage area acquired from the cost information retaining unit for each of the processing devices to determine the destination processing device such that the cost information of the processing devices is equalized.

4. The storage system of claim 1, wherein if it is determined that a data IO process in execution exists for the unit logical storage areas, the processing device changing unit is configured to suspend the change of the processing device until the data IO process in execution no longer exists.

5. The storage system of claim 1, wherein if the unit logical storage areas are set up with a local copy function that is a function of copying data stored in the unit logical storage area into different one of the unit logical storage areas in the same storage system, when the processing device responsible for one of the unit logical storage areas is changed, the processing device changing unit is configured to change the processing device responsible for the different one of the unit logical storage areas to the processing device that is the destination of the one of the unit logical storage areas.

6. The storage system of claim 5, wherein if it is determined that a job accessing any one of the unit logical storage areas set up with the local copy function exists, the processing device changing unit is configured to suspend the change of the processing device responsible for the unit logical storage area until the job no longer exists.

7. The storage system of claim 1, wherein if the unit logical storage areas are set up with an extended storage area function providing an extended storage area that is one logical storage area created by a plurality of the unit logical storage areas for the external apparatus and if it is determined that the unit logical storage areas are unit logical storage areas making up the extended storage area, when the processing device responsible for any one of the unit logical storage areas making up the extended storage area is changed, the processing device changing unit is configured to change the processing device responsible for the other unit logical storage areas making up the extended storage area to the processing device that is the destination of the change.

8. The storage system of claim 7, wherein when the processing device responsible for the unit logical storage area making up the extended storage area is changed, if it is determined that no data IO process in execution exists for the unit logical storage area and that the processing device responsible for the other unit logical storage areas including an address preceding the start address of the unit logical storage area having the responsible processing device to be changed is already changed, the processing device changing unit is configured to execute the change of the processing device.

9. The storage system of claim 1, wherein the unit logical storage areas are set up with a remote copy function configured with a primary storage area that normally processes data IO of the external apparatus, a secondary storage area to which the data stored in the primary storage area at a certain time point is copied, and a temporary storage area that temporarily stores data copied from the primary storage area to the secondary storage area, and a primary remote copy group is made up of the primary storage area and the temporary storage area and a secondary remote copy group is made up of the secondary storage area and the temporary storage area, and the processing device changing unit is configured to change the processing device responsible for the primary remote copy group to the processing device that is the destination responsible for the temporary storage area when the processing device responsible for the temporary storage area belonging to the primary remote copy group is changed, and is configured to change the processing device responsible for the secondary remote copy group to the processing device that is the destination responsible for the temporary storage area when the processing device responsible for the temporary storage area belonging to the secondary remote copy group is changed.

10. The storage system of claim 9, wherein when the processing device responsible for the temporary storage area or the secondary storage area belonging to the secondary remote copy group is changed, if it is determined that no job accessing the temporary storage area or the secondary storage area exists and that the processing device responsible for the secondary remote copy group including the temporary storage area and the secondary storage area is the processing device that is the destination of the temporary storage area or the secondary storage area, the change of the processing device responsible for the temporary storage area or the secondary storage area is configured to be executed.

11. The storage system of claim 1, wherein the processing device changing unit is configured to retain a data write count to each of the unit logical storage areas and a data read count from each of the unit logical storage areas per unit time for the unit logical storage areas not set up with the storage function among the unit logical storage areas with responsibilities taken by the processing devices to calculate a total cost required for the data process of the unit logical storage areas not set up with the storage function from the data write count and the data read count and the cost information required for single data write and data read acquired from the cost information retaining unit.

12. A processing efficiency improving method of a storage system having a storage device that includes a storage medium providing a plurality of unit logical storage areas used as data storage areas of an external apparatus and a plurality of processing devices communicatively coupled to the storage device to execute data IO processes for the unit logical storage areas from the external apparatus, the storage system further having a responsible processing device retaining unit that retains the unit logical storage areas and the processing devices executing the data IO processes of the unit logical storage areas in a correlated manner, and a storage function retaining unit that retains the unit logical storage areas and storage function information that is information set for the unit logical storage areas to indicate the usage aspects of the unit logical storage areas in a correlated manner, wherein the method comprises:

acquiring the processing device correlated with each of the logical storage areas from the responsible processing device retaining unit based on the storage function set for the unit logical storage areas acquired from the storage function retaining unit for the unit logical storage areas;

determining whether the same processing device is responsible for the unit logical storage areas; and changing the processing device responsible for different one of the unit logical storage areas such that any one of the processing devices responsible for the unit logical storage areas becomes responsible for the different one of the unit logical storage areas if it is determined that the same processing device is not responsible.

13. The processing efficiency improving method of the storage system of claim 12, wherein if the unit logical storage areas are set up with a local copy function that is a function of copying data stored in the unit logical storage area into different one of the unit logical storage areas in the same storage system, when the processing device responsible for one of the unit logical storage areas is changed, the storage system changing the processing device responsible for the different one of the unit logical storage areas to the processing device that is the destination of the one of the unit logical storage areas.

14. The processing efficiency improving method of the storage system of claim 12, wherein the unit logical storage areas are set up with an extended storage area function providing an extended storage area that is one logical storage area created by a plurality of the unit logical storage areas for the external apparatus and if it is determined that the unit logical storage areas are unit logical storage areas making up the extended storage area, when the processing device responsible for any one of the unit logical storage areas making up the extended storage area is changed, the storage system changing the processing device responsible for different one of the unit logical storage areas making up the extended storage area to the processing device that is the destination of the change.

15. The processing efficiency improving method of the storage system of claim 12, wherein the unit logical storage areas are set up with a remote copy function configured with a primary storage area that normally processes data IO of the external apparatus, a secondary storage area to which the data stored in the primary storage area at a certain time point is copied, and a temporary storage area that temporarily stores data copied from the primary storage area to the secondary storage area and a primary remote copy group is made up of the primary storage area and the temporary storage area and a secondary remote copy group is made up of the secondary storage area and the temporary storage area, and the storage system changing the processing device responsible for the primary remote copy group to the processing device that is the destination responsible for the temporary storage area when the processing device responsible for the temporary storage area belonging to the primary remote copy group is changed and changing the processing device responsible for the secondary remote copy group to the processing device that is the destination responsible for the temporary storage area when the processing device responsible for the temporary storage area belonging to the secondary remote copy group is changed.

\* \* \* \* \*